United States Patent
Shimaya

(10) Patent No.: US 10,644,533 B2
(45) Date of Patent: May 5, 2020

(54) ELECTRONIC DEVICE, IMAGING APPARATUS, AND METHOD OF SWITCHING POWER SOURCE

(71) Applicant: FUJIFILM Corporation, Tokyo (JP)

(72) Inventor: Hiroshi Shimaya, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/426,700

(22) Filed: May 30, 2019

(65) Prior Publication Data

US 2019/0280516 A1 Sep. 12, 2019

Related U.S. Application Data

(63) Continuation of application No. PCT/JP2017/040714, filed on Nov. 13, 2017.

(30) Foreign Application Priority Data

Dec. 27, 2016 (JP) .................... 2016-253324

(51) Int. Cl.
*H02J 7/34* (2006.01)
*G03B 17/02* (2006.01)
(Continued)

(52) U.S. Cl.
CPC .......... *H02J 7/34* (2013.01); *G03B 17/00* (2013.01); *G03B 17/02* (2013.01); *H02J 1/00* (2013.01);
(Continued)

(58) Field of Classification Search
CPC ..................................... G03B 7/26
See application file for complete search history.

(56) References Cited

U.S. PATENT DOCUMENTS 6,753,921 B1 * 6/2004 Shimizu ............ H04N 5/232
348/207.1

FOREIGN PATENT DOCUMENTS

JP  11146254 A  *  5/1999
JP  2001230960 A  *  8/2001
(Continued)

OTHER PUBLICATIONS

International Preliminary Report on Patentability and Written Opinion of the International Searching Authority for International Application No. PCT/JP2017/040714, dated Jul. 11, 2019, with English translation of the Written Opinion.
(Continued)

*Primary Examiner* — Clayton E. LaBalle
*Assistant Examiner* — Leon W Rhodes, Jr.
(74) *Attorney, Agent, or Firm* — Birch, Stewart, Kolasch & Birch, LLP

(57) ABSTRACT

An electronic device, an imaging apparatus, and a method of switching a power source that can smoothly switch a power source while preventing instantaneous interruption in a case where power source supply lines are shut off from each other between a device body and an external device on which a plurality of power sources can be mounted. A power source-switching preparation unit performs first processing for shifting an electronic device to an electric power-saving state and second processing for shifting the electronic device to a state where electric power can be supplied from a plurality of power sources, as switching preparation, and a power source-switching control unit switches a main power source according to a set order of priority in a state where the switching preparation is performed.

20 Claims, 20 Drawing Sheets

(51) Int. Cl.
      *H02J 1/00*       (2006.01)
      *H02J 9/06*       (2006.01)
      *H02J 9/00*       (2006.01)
      *H04N 5/232*      (2006.01)
      *G03B 17/00*      (2006.01)

(52) U.S. Cl.
      CPC ................ *H02J 9/00* (2013.01); *H02J 9/06* (2013.01); *H04N 5/232* (2013.01)

(56) References Cited

FOREIGN PATENT DOCUMENTS

| | | | |
|---|---|---|---|
| JP | 2005-151626 A | | 6/2005 |
| JP | 2006-149078 A | | 6/2006 |
| JP | 2008205833 A | * | 9/2008 |
| JP | 2016-34186 A | | 3/2016 |
| WO | WO 2015/184994 A1 | | 12/2015 |

OTHER PUBLICATIONS

International Search Report for International Application No. PCT/JP2017/040714, dated Dec. 26, 2017, with English translation.

* cited by examiner

FIG. 8

| | BODY BATTERY | BODY ADAPTER | GRIP BATTERY | GRIP ADAPTER |
|---|---|---|---|---|
| INITIAL SETTING A | ORDER OF PRIORITY: 2 | ORDER OF PRIORITY: 1 | ORDER OF PRIORITY: 4 | ORDER OF PRIORITY: 3 |
| INITIAL SETTING B | ORDER OF PRIORITY: 1 | ORDER OF PRIORITY: 2 | ORDER OF PRIORITY: 3 | ORDER OF PRIORITY: 4 |

FIG. 9

| No. | STATE | BODY BATTERY | BODY ADAPTER | GRIP BATTERY | GRIP ADAPTER |
|---|---|---|---|---|---|
| 1 | INITIAL STATE | WITHOUT (NOT MOUNTED) | WITHOUT (NOT MOUNTED) | WITH (MOUNTED) | WITHOUT (NOT MOUNTED) |
| 2 | ORDER OF PRIORITY | - | - | ORDER OF PRIORITY: 1 ⇒ USED AS MAIN POWER SOURCE | - |
| 3 | BODY ADAPTER IS MOUNTED | - | WITH (MOUNTED LATER) ⇒ ORDER OF PRIORITY: 2 | - | - |

FIG. 12

| No. | STATE | BODY BATTERY | BODY ADAPTER | GRIP BATTERY | GRIP ADAPTER |
|---|---|---|---|---|---|
| 1 | VOLTAGE DROP OF GRIP BATTERY | WITHOUT (NOT MOUNTED) | WITH (MOUNTED LATER) | WITH (MOUNTED) ⇒ VOLTAGE DROP | WITHOUT (NOT MOUNTED) |
| 2 | VIRTUAL MOUNTING OF GRIP ADAPTER | - | - | - | MOUNT GRIP ADAPTER VIRTUALLY (USE GRIP-SIDE CAPACITOR) |
| 3 | SWITCHING PREPARATION (SHIFT CAMERA SYSTEM TO ELECTRIC POWER-SAVING STATE) | - | - | - | SHIFT CAMERA SYSTEM TO ELECTRIC POWER-SAVING STATE BY GRIP-SIDE CAPACITOR |
| 4 | SWITCHING PREPARATION (SHIFT CAMERA SYSTEM TO SWITCHBLADE STATE) | - | TURN ON BODY ADAPTER | - | TURN OFF GRIP-SIDE CAPACITOR AND TURN ON GRIP-SIDE BACKUP POWER SOURCE |
| 5 | SWITCH MAIN POWER SOURCE | - | SET TO MAIN POWER SOURCE | - | SWITCHED TO BODY ADAPTER |
| 6 | RETURN CAMERA SYSTEM TO NORMAL STATE | - | USED AS MAIN POWER SOURCE | - | TURN OFF GRIP-SIDE BACKUP POWER SOURCE AND RELEASE VIRTUAL MOUNTING STATE |

FIG. 14

| No. | STATE | BODY BATTERY | BODY ADAPTER | GRIP BATTERY | GRIP ADAPTER |
|---|---|---|---|---|---|
| 1 | VOLTAGE DROP OF GRIP BATTERY | WITHOUT (NOT MOUNTED) | WITH (MOUNTED LATER) | WITH (MOUNTED) ⇒ VOLTAGE DROP | WITHOUT (NOT MOUNTED) |
| 2 | VIRTUAL MOUNTING OF GRIP ADAPTER | - | - | TURN OFF GRIP BATTERY | ⇒ MOUNT GRIP ADAPTER VIRTUALLY (USE GRIP-SIDE CAPACITOR) |
| 3 | SWITCHING PREPARATION (SHIFT CAMERA SYSTEM TO ELECTRIC POWER-SAVING STATE) | - | - | - | SHIFT CAMERA SYSTEM TO ELECTRIC POWER-SAVING STATE BY GRIP-SIDE CAPACITOR |
| 4 | SWITCHING PREPARATION (SHIFT CAMERA SYSTEM TO SWITCHBLADE STATE) | - | TURN ON BODY ADAPTER | - | (CONTINUE TO USE GRIP-SIDE CAPACITOR) |
| 5 | SWITCH MAIN POWER SOURCE | - | SET TO MAIN POWER SOURCE | - | SWITCHED TO BODY ADAPTER |
| 6 | RETURN CAMERA SYSTEM TO NORMAL STATE | - | USED AS MAIN POWER SOURCE | - | TURN OFF GRIP-SIDE CAPACITOR AND RELEASE VIRTUAL MOUNTING STATE |

FIG. 15

| No. | STATE | BODY BATTERY | BODY ADAPTER | GRIP BATTERY | GRIP ADAPTER |
|---|---|---|---|---|---|
| 1 | INITIAL STATE | WITHOUT (NOT MOUNTED) | WITH (NOT MOUNTED) | WITH (MOUNTED) | WITH (MOUNTED) |
| 2 | ORDER OF PRIORITY | - | ORDER OF PRIORITY: 3 | ORDER OF PRIORITY: 2 | ORDER OF PRIORITY: 1 ⇒ USED AS MAIN POWER SOURCE |
| 3 | LOSS OF POWER SOURCE OF GRIP ADAPTER | - | - | - | USED AS MAIN POWER SOURCE ⇒ LOSS OF POWER SOURCE |

FIG. 18

| No. | STATE | BODY BATTERY | BODY ADAPTER | GRIP BATTERY | GRIP ADAPTER |
|---|---|---|---|---|---|
| 1 | LOSS OF POWER SOURCE OF GRIP ADAPTER | WITHOUT (NOT MOUNTED) | WITH (MOUNTED) | WITH (MOUNTED) | USED AS MAIN POWER SOURCE ⇒ LOSS OF POWER SOURCE |
| 2 | SWITCHING PREPARATION (SHIFT CAMERA SYSTEM TO ELECTRIC POWER-SAVING STATE) | - | - | - | SHIFT CAMERA SYSTEM TO ELECTRIC POWER-SAVING STATE BY GRIP-SIDE CAPACITOR |
| 3 | SWITCHING PREPARATION (SHIFT CAMERA SYSTEM TO SWITCHBLADE STATE) | - | - | TURN ON GRIP BATTERY | TURN OFF GRIP-SIDE CAPACITOR AND TURN ON GRIP-SIDE BACKUP POWER SOURCE |
| 4 | SWITCH MAIN POWER SOURCE | - | - | SET TO MAIN POWER SOURCE | SWITCHED TO GRIP BATTERY |
| 5 | RETURN CAMERA SYSTEM TO NORMAL STATE | - | - | USED AS MAIN POWER SOURCE | TURN OFF GRIP-SIDE BACKUP POWER SOURCE |

FIG. 20

| No. | STATE | BODY BATTERY | BODY ADAPTER | GRIP BATTERY | GRIP ADAPTER |
|---|---|---|---|---|---|
| 1 | LOSS OF POWER SOURCE OF GRIP ADAPTER | WITHOUT (NOT MOUNTED) | WITH (MOUNTED) | WITH (MOUNTED) | USED AS MAIN POWER SOURCE ⇒ LOSS OF POWER SOURCE |
| 2 | SWITCHING PREPARATION (SHIFT CAMERA SYSTEM TO ELECTRIC POWER-SAVING STATE) | – | – | – | SHIFT CAMERA SYSTEM TO ELECTRIC POWER-SAVING STATE BY GRIP-SIDE CAPACITOR |
| 3 | SWITCHING PREPARATION (SHIFT CAMERA SYSTEM TO SWITCHBLADE STATE) | – | – | TURN ON GRIP BATTERY | (CONTINUE TO USE GRIP-SIDE CAPACITOR) |
| 4 | SWITCH MAIN POWER SOURCE | – | – | SET TO MAIN POWER SOURCE | SWITCHED TO GRIP BATTERY |
| 5 | RETURN CAMERA SYSTEM TO NORMAL STATE | – | – | USED AS MAIN POWER SOURCE | TURN OFF GRIP-SIDE CAPACITOR |

ELECTRONIC DEVICE, IMAGING APPARATUS, AND METHOD OF SWITCHING POWER SOURCE

CROSS-REFERENCE TO RELATED APPLICATIONS

This application is a Continuation of PCT International Application No. PCT/JP2017/040714 filed on Nov. 13, 2017, which claims priority under 35 U.S.C § 119(a) to Japanese Patent Application No. 2016-253324 filed on Dec. 27, 2016. Each of the above application(s) is hereby expressly incorporated by reference, in its entirety, into the present application.

BACKGROUND OF THE INVENTION

1. Field of the Invention

The present invention relates to an electronic device, an imaging apparatus, and a method of switching a power source, and more particularly, to an electronic device that switches power sources mounted on a device body and an external device, an imaging apparatus that comprises the electronic device, and a method of switching power sources mounted on a device body and an external device of an electronic device.

2. Description of the Related Art

In an electronic device including a device body and an external device, power sources (a battery and an external power source adapter) are mounted on both the device body and the external device and are switched as necessary. In this case, instantaneous interruption (a phenomenon where the supply of electric power from a power source is interrupted for a short time) occurs depending on the configuration of the device at the time of switching of the power source, so that a system is shut down. Accordingly, a technique, which switches a power source while preventing instantaneous interruption, is used.

For example, JP2016-034186A discloses a power supply system that supplies electric power from a capacitor during the switching of electric discharge to switch power sources (a main battery and a sub-battery) while preventing instantaneous interruption. Further, JP2006-149078A discloses a power supply system that prevents instantaneous interruption at the time of detachment of an external battery by a clamp circuit including a diode using the output of a secondary battery.

SUMMARY OF THE INVENTION

In a case where a plurality of power sources can be mounted by a device body and an external device and power source supply lines of these power sources are connected to each other so that a power source can be supplied to each other, a loss (voltage drop) is generated by a backflow prevention element, such as a diode. On the other hand, in a case where the power source supply lines are shut off in the device body and the external device, electric power cannot be directly supplied to the device body and external device and instantaneous interruption occurs at the time of switching of the power source. For this reason, there is a concern that a system may be shut down. Here, the fact that the power source supply lines are shut off in the device body and the external device means that the power source supply line of the device body and the power source supply line of the external device are independent of each other and are not connected to each other. In regard to instantaneous interruption occurring at the time of switching of the power source, the control of the state of a load at the time of switching of a power source is not mentioned in JP2016-034186A and JP2006-149078A having been described above but a capacitor having large capacitance or a secondary battery having a large capacity is required to prevent instantaneous interruption in a state where the state of a load is maintained. Accordingly, there is a concern that the power source cannot be switched in a case where the capacitance of the capacitor or the capacity of the secondary battery is not sufficient. Further, the criterion, which is used for the switching of a power source between these power sources in a case where a plurality of power sources (a battery and a power source adapter) are mounted on each of the device body and the external device, is not mentioned in JP2016-034186A and JP2006-149078A.

As described above, in the related art, it was difficult to smoothly switch a power source while preventing instantaneous interruption in a case where the power source supply lines are shut off from each other between the device body and the external device on which the plurality of power sources can be mounted.

The invention has been made in consideration of the above-mentioned circumstances, and an object of the invention is to provide an electronic device, an imaging apparatus, and a method of switching a power source that can smoothly switch a power source while preventing instantaneous interruption in a case where power source supply lines are shut off from each other between a device body and an external device on which a plurality of power sources can be mounted.

To achieve the above-mentioned object, an electronic device according to a first aspect of the invention includes a device body on which a battery power source and an adapter power source are mountable, and an external device which is to be attached or detached to or from the device body and on which a battery power source and an adapter power source are mountable. Electric power supply lines of the battery power source and the adapter power source of the device body and electric power supply lines of the battery power source and the adapter power source of the external device are shut off from each other. The device body includes an order-of-priority setting unit that sets an order of priority of supply of electric power to the electronic device between the battery power source and the adapter power source of the device body and the battery power source and the adapter power source of the external device, a power source-switching preparation unit that performs switching preparation of a main power source which is a power source formed of either battery power source and the adapter power source of the device body, or the battery power source and the adapter power source of the external device and supplies electric power to the electronic device, and a power source-switching control unit that switches the main power source among the battery power source and the adapter power source of the device body and the battery power source and the adapter power source of the external device on the basis of the set order of priority according to a state of the main power source. The power source-switching preparation unit performs first processing for shifting the electronic device to an electric power-saving state and second processing for shifting the electronic device to a state where electric power is capable of being supplied from a plurality of power sources among the battery power source and the adapter power source of the device body and the battery power source and the adapter power source of the external device, as the switching preparation. The power source-switching control unit switches the main power source according to the set order of priority in a state where the switching preparation is performed.

In the electronic device according to the first aspect, the power source-switching preparation unit performs processing, which includes first processing for shifting an electronic device to an electric power-saving state and second processing for shifting the electronic device to a state where electric power can be supplied from a plurality of power sources, as switching preparation, and the power source-switching control unit switches the main power source according to the set order of priority in a state where the switching preparation is performed. Accordingly, it is possible to smoothly switch a power source while preventing instantaneous interruption in the electronic device where power source supply lines are shut off from each other between the device body and the external device on which the plurality of power sources can be mounted.

According to an electronic device of a second aspect, in the first aspect, the power source-switching preparation unit shifts the electronic device to a first switchable state where electric power is capable of being supplied from both the battery power source or the adapter power source of the device body and the battery power source or the adapter power source of the external device, and the power source-switching control unit switches the main power source in a state where the electronic device is shifted to the first switchable state. In the second aspect, the main power source is switched (to the external device side from the device body side or to the device body side from the external device side) in a state where the electronic device is shifted to the first switchable state where electric power can be supplied from the plurality of power sources. Accordingly, it is possible to smoothly switch a power source while preventing instantaneous interruption. The shift of the electronic device to the first switchable state can be performed as the above-mentioned second processing.

According to an electronic device of a third aspect, in the second aspect, the power source-switching preparation unit virtually shifts the electronic device to a state where electric power is also capable of being supplied from the adapter power source of any one of the device body or the external device as the first switchable state in a case where the power source-switching preparation unit detects that electric power is capable of being supplied from the adapter power source of any one of the device body or the external device, and the power source-switching control unit switches the main power source in the first switchable state to which the electronic device is virtually shifted. According to the third aspect, as in the second aspect, it is possible to smoothly switch a power source while preventing instantaneous interruption. Another power source or element, which can supply electric power, can be used at the time of the virtual shift of the electronic device.

According to an electronic device of a fourth aspect, in the first aspect, the power source-switching preparation unit shifts the electronic device to any one of a second switchable state where electric power is capable of being supplied from both the battery power source and the adapter power source of the device body or a third switchable state where electric power is capable of being supplied from both the battery power source and the adapter power source of the external device, and the power source-switching control unit switches the main power source in a state where the electronic device is shifted to the second switchable state or the third switchable state. In the fourth aspect, as in the second aspect, the main power source is switched (between the battery power source and the adapter power source of the device body or between the battery power source and the adapter power source of the external device) in a state where the electronic device is shifted to the second switchable state or the third switchable state where electric power can be supplied from the plurality of power sources. Accordingly, it is possible to smoothly switch a power source while preventing instantaneous interruption. The shift of the electronic device to the second switchable state or the third switchable state can be performed as the above-mentioned second processing.

According to an electronic device of a fifth aspect, in any one of the first to fourth aspects, the order-of-priority setting unit sets the order of priority of one of the device body and the external device, to which electric power is capable of being supplied from both the battery power source and the adapter power source, to an order of priority higher than the order of priority of one of the device body and the external device to which electric power is not capable of being supplied from both the battery power source and the adapter power source. Since there is an available capacity in electric power supply capacity in a case where electric power can be supplied from both the battery power source and the adapter power source, the order of priority of one of the device body and the external device where there is an available capacity in electric power supply capacity is set high in the fifth aspect.

According to an electronic device of a sixth aspect, in any one of the first to fifth aspects, the order-of-priority setting unit sets the order of priority of the adapter power source of the device body to an order of priority higher than the order of priority of the battery power source of the device body, and sets the order of priority of the adapter power source of the external device to an order of priority higher than the order of priority of the battery power source of the external device. Since the battery power source is exhausted by use but the adapter power source, such as alternating current (AC) power source, is not actually exhausted, the order of priority of the adapter power source is set to be higher than the order of priority of the battery power source in the sixth aspect.

According to an electronic device of a seventh aspect, in any one of the first to sixth aspects, the power source-switching preparation unit performs the switching preparation by using electric charges that are accumulated in a capacitor provided in the device body or a capacitor provided in the external device. Since electric charges are accumulated in these capacitors due to the normal use of the electronic device, the switching preparation is performed using the electric charges in the seventh aspect.

According to an electronic device of an eighth aspect, in any one of the first to seventh aspects, the power source-switching control unit switches the main power source by using a backup power source provided in the device body or a backup power source provided in the external device. According to the eighth aspect, even though the power source, such as a battery or an adapter, is exhausted or lost, it is possible to smoothly switch a power source while preventing instantaneous interruption by the backup power source (for example, a battery for retaining the data of a memory or a clock).

According to an electronic device of a ninth aspect, in any one of the first to eighth aspects, the power source-switching control unit switches the main power source by using electric charges that are accumulated in a capacitor provided in the device body or a capacitor provided in the external device. Since electric charges are accumulated in these capacitors due to the normal use of the electronic device, the main power source is switched using the electric charges in the ninth aspect.

According to a tenth aspect, the electronic device according to any one of the first to ninth aspects further comprises a storage unit that stores software controlling the switching preparation and the switching, the power source-switching preparation unit performs the switching preparation by using the stored software, and the power source-switching control unit performs the switching by using the stored software.

According to an electronic device of an eleventh aspect, in any one of the first to tenth aspects, the device body comprises a power source detection unit detecting from which of the battery power source and the adapter power source of the device body and the battery power source and the adapter power source of the external device electric power is capable of being supplied, and the order-of-priority setting unit sets the order of priority on the basis of a result of the detection. The setting of the order of priority based on the result of the detection of the power source can be performed at the time of start of use of the electronic device and after the start of the use of the electronic device. Further, the order of priority may be set according to the mounting, detachment, or the like of the battery power source and/or the adapter power source after the start of the use.

According to an electronic device of a twelfth aspect, in any one of the first to eleventh aspects, the state of the main power source is a voltage level of the main power source. According to the twelfth aspect, since the switching according to the voltage level of the main power source is performed, it is possible to smoothly switch a power source according to the exhaustion of the battery power source caused by long time use and the voltage drop of the power source caused by detachment or the like of the battery power source and/or the adapter power source.

To achieve the above-mentioned object, an imaging apparatus according to a thirteenth aspect of the invention includes the electronic device according to any one of the first to twelfth aspects, an imaging optical system that is provided in the device body, and an imaging element that is provided in the device body and outputs a signal representing an optical image of a subject formed by the imaging optical system. Since the imaging apparatus according to the thirteenth aspect includes the electronic device according to the first to twelfth aspects, it is possible to smoothly switch a power source while preventing instantaneous interruption in the configuration of the imaging apparatus (electronic device) and the external device on which the plurality of power sources (batteries and adapters) can be mounted. Further, the switching of a power source can be performed without a loss (voltage drop).

According to an imaging apparatus of a fourteenth aspect, in the thirteenth aspect, the power source-switching control unit does not perform the switching of the main power source in a case where the imaging apparatus is not in a state where the main power source is switchable. According to the fourteenth aspect, it is possible to prevent a malfunction, a trouble, and the like caused by compulsive switching and to smoothly switch a power source.

According to an imaging apparatus of a fifteenth aspect, in the fourteenth aspect, the power source-switching preparation unit determines that the imaging apparatus is not in the state where the main power source is switchable, during a period until image data representing the subject is generated and recorded after the imaging element outputs the signal. In the fifteenth aspect, during the prescribed period, it is determined that "the imaging apparatus is not in the state where the main power source is switchable" and the switching is not performed. Accordingly, it is possible to prevent the corruption or loss of image data that is being processed (being generated or recorded).

According to an imaging apparatus of a sixteenth aspect, in any one of the thirteenth to fifteenth aspects, the power source-switching preparation unit shifts the imaging optical system and the imaging element to a sleep state as the electric power-saving state. In the sixteenth aspect, elements having high power consumption are set to a sleep state, so that the electronic device is shifted to an electric power-saving state and the switching of a power source is smoothly performed. The "imaging optical system" to be shifted to a sleep state may include lenses, such as an imaging lens, a focus lens, and a zoom lens, and a drive unit thereof.

According to an imaging apparatus of a seventeenth aspect, in any one of the thirteenth to sixteenth aspects, the external device is an external grip for the device body. In a case where the external grip is mounted on the imaging apparatus, a battery having a large capacity and a high voltage may be mounted on the external grip. Accordingly, it is possible to smoothly switch a power source in that case in the seventeenth aspect.

To achieve the above-mentioned object, a method of switching a power source according to an eighteenth aspect of the invention is a method of switching a power source of an electronic device including a device body on which a battery power source and an adapter power source are mountable and an external device which is to be attached or detached to or from the device body and on which a battery power source and an adapter power source are mountable, electric power supply lines of the battery power source and the adapter power source of the device body and electric power supply lines of the battery power source and the adapter power source of the external device being shut off from each other. The method includes: an order-of-priority setting step of setting an order of priority of supply of electric power to the electronic device between the battery power source and the adapter power source of the device body and the battery power source and the adapter power source of the external device; a power source switching-preparation step of performing switching preparation of a main power source as a power source formed of either the battery power source and the adapter power source of the device body, or the battery power source and the adapter power source of the external device and supplying electric power to the electronic device; and a power source switching-control step of switching the main power source among the battery power source and the adapter power source of the device body and the battery power source and the adapter power source of the external device on the basis of the set order of priority according to a state of the main power source. Processing, which includes first processing for shifting the electronic device to an electric power-saving state and second processing for shifting the electronic device to a state where electric power is capable of being supplied from a plurality of power sources among the battery power source and the adapter power source of the device body and the battery power source and the adapter power source of the external device, is performed in the power source switching-preparation step as the switching preparation. In the power source switching-control step, the main power source is switched according to the set order of priority in a state where the switching preparation is performed.

According to the eighteenth aspect, as in the first aspect, it is possible to smoothly switch a power source while preventing instantaneous interruption in the electronic device where power source supply lines are shut off from each other between the device body and the external device on which the plurality of power sources can be mounted. The method of switching a power source according to the eighteenth aspect can be performed even in the above-mentioned imaging apparatuses according to the thirteenth to seventeenth aspects, and the same structure as the second to twelfth aspects may be included in the method of switching a power source according to the eighteenth aspect. Further, aspects of the invention can include a program that allows the electronic device to perform the methods of switching a power source of these aspects, and a non-temporary recording medium in which computer-readable codes of the program are recorded.

As described above, according to the electronic device, the imaging apparatus, and the method of switching a power source of the embodiments of the invention, it is possible to smoothly switch a power source while preventing instantaneous interruption in a case where power source supply lines are shut off from each other between a device body and an external device on which a plurality of power sources can be mounted.

BRIEF DESCRIPTION OF THE DRAWINGS

FIG. 8 is a table showing an example of the initial setting of the order of priority.

FIG. 9 is a table showing the state of a power source of Example 1 (Case 1) of power source switching control.

FIG. 12 is another table showing the state of a power source of Example 1 (Case 1) of the power source switching control.

FIG. 14 is a table showing the state of a power source of Example 1 (Case 2) of the power source switching control.

FIG. 15 is a table showing the state of a power source of Example 2 (Case 1) of the power source switching control.

FIG. 18 is a table showing the state of a power source of Example 2 (Case 1) of the power source switching control.

FIG. 20 is a table showing the state of a power source of Example 2 (Case 2) of the power source switching control.

DESCRIPTION OF THE PREFERRED EMBODIMENTS

An electronic device, an imaging apparatus, and a method of switching a power source according to embodiments of the invention will be described in detail below with reference to the accompanying drawings.

<Configuration of Camera System>

Figure 4A:
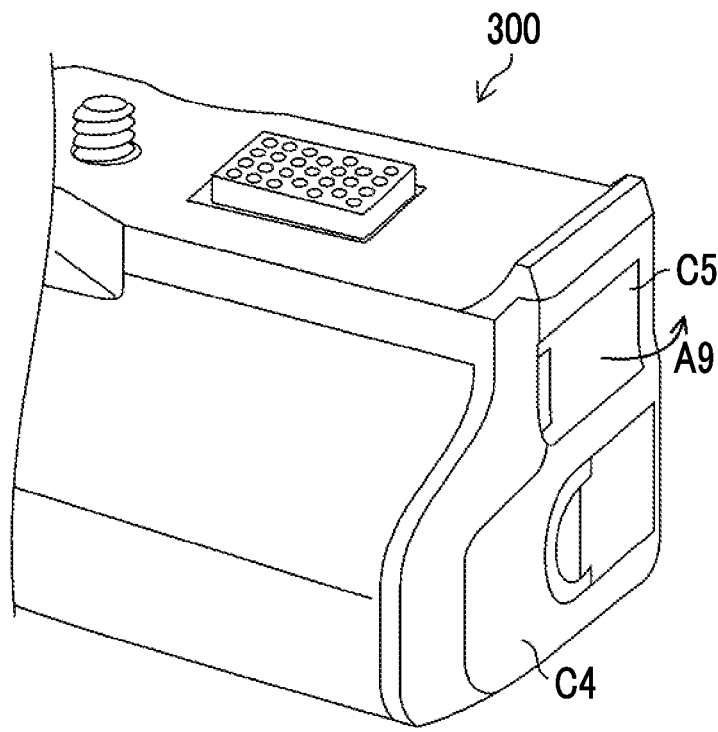
FIGS. 4A and 4B are partial perspective views showing an appearance where a power source cable is to be mounted on the grip.
Figure 4B:
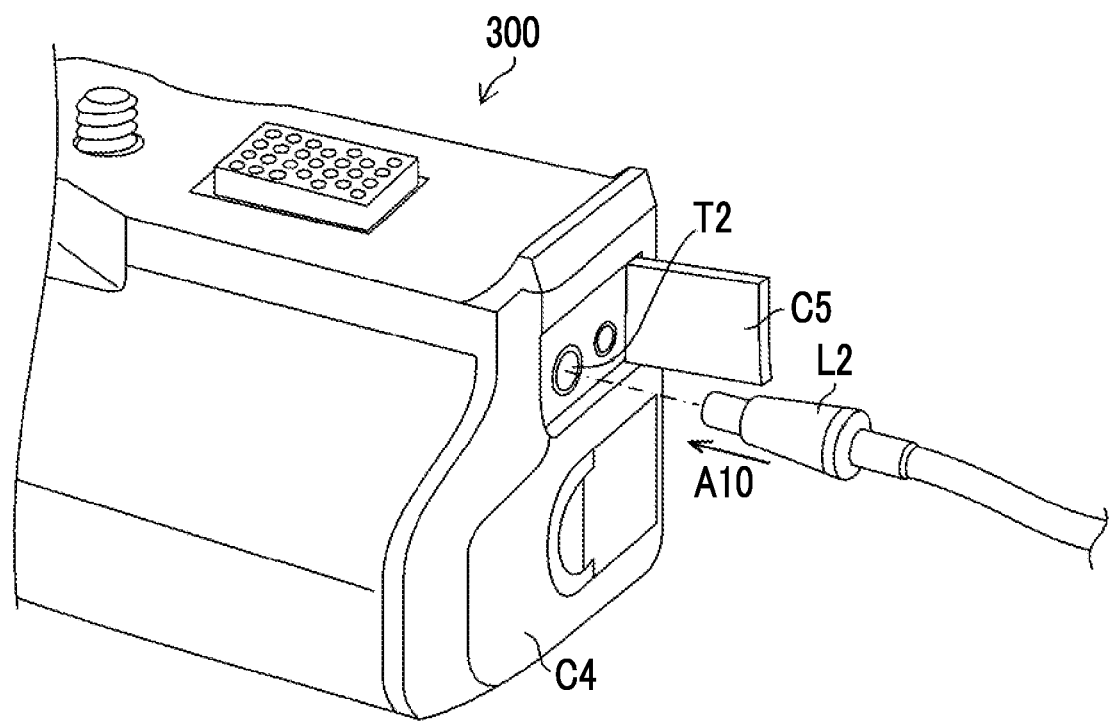
Figure 5:
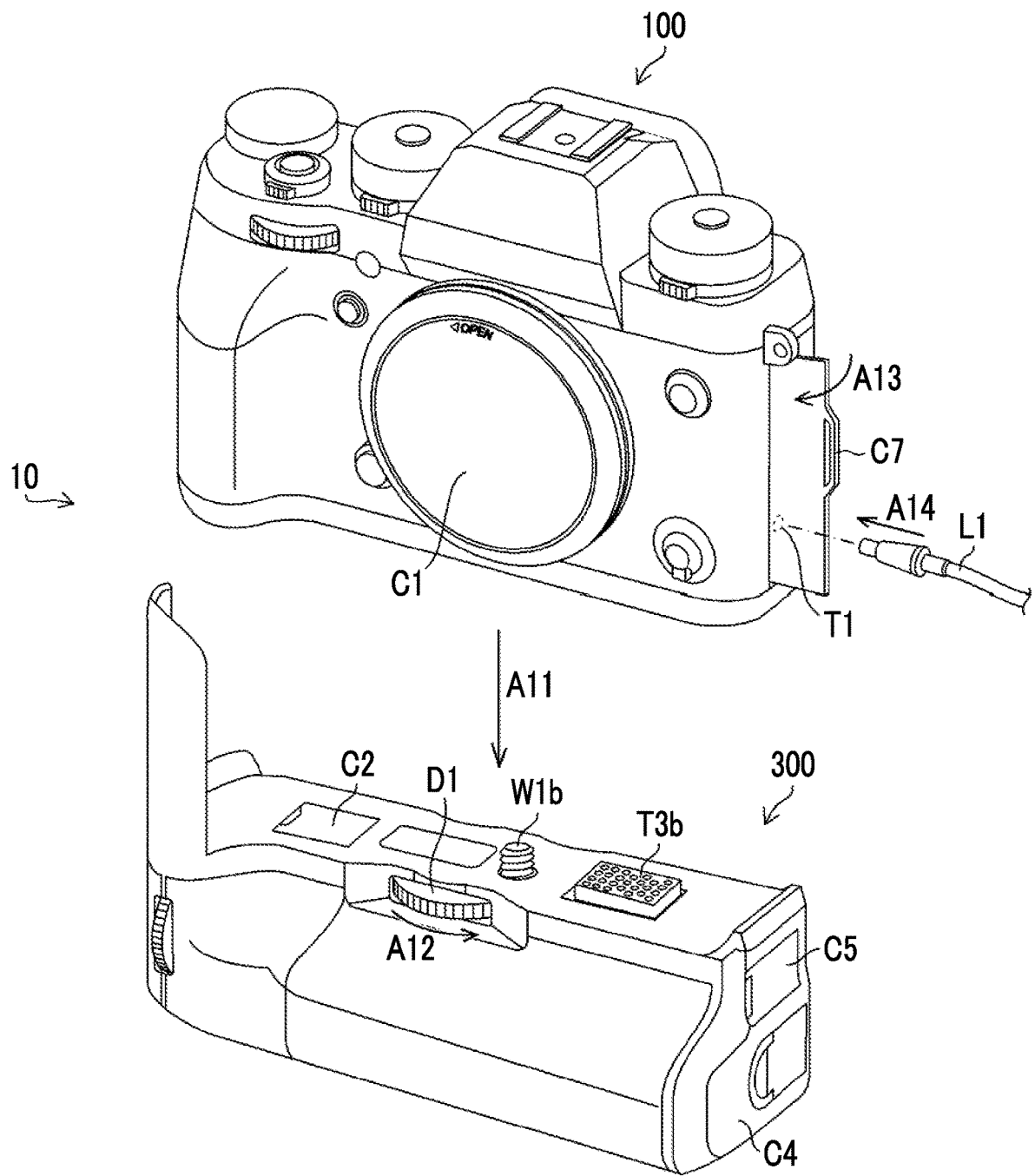
FIG. 5 is a perspective view showing an appearance where the camera body is to be mounted on the grip.
Figure 6:
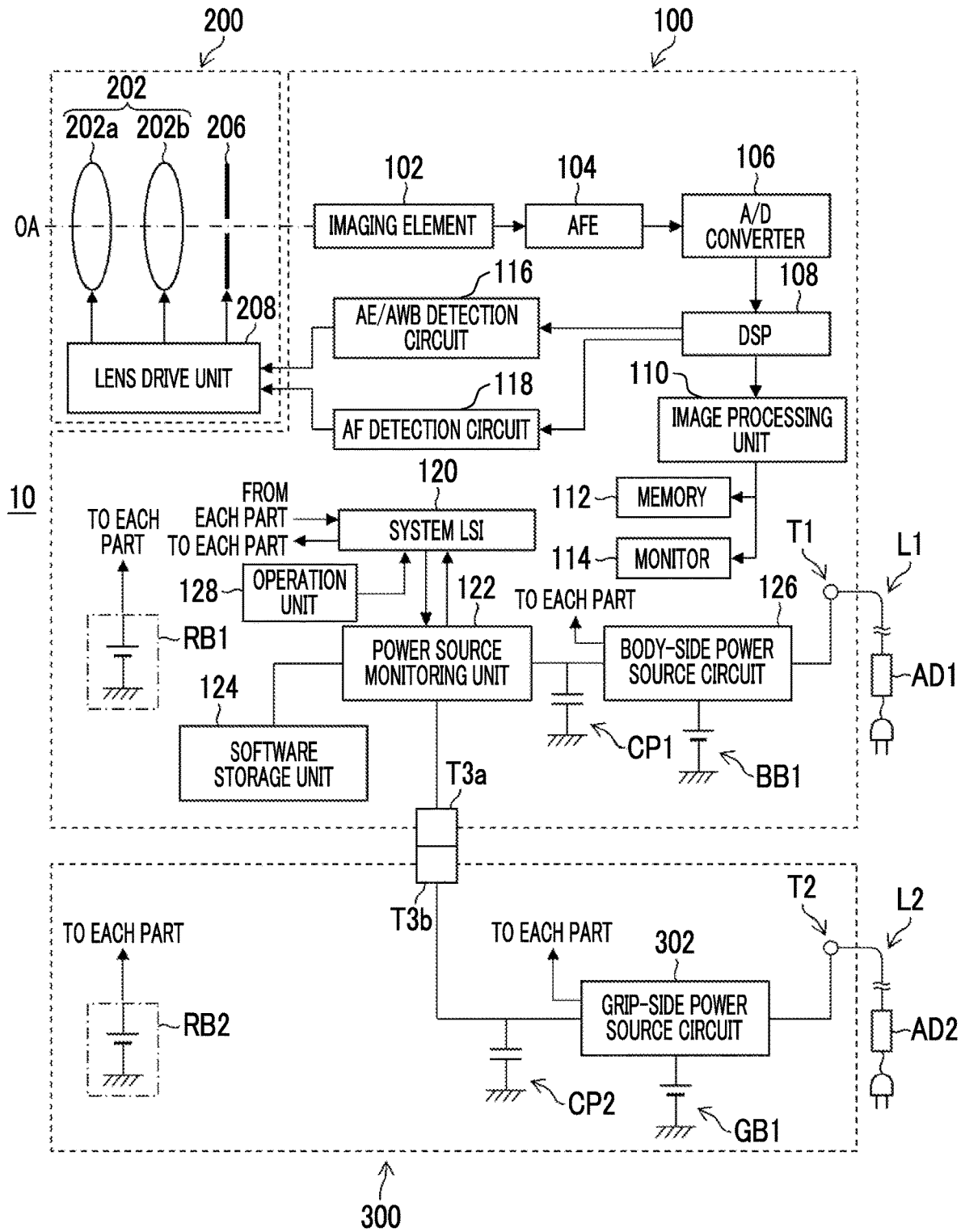
FIG. 6 is a block diagram showing the configuration of a camera system.

FIGS. 1 to 5 are perspective views showing the appearance of a camera system 10 (an electronic device and an imaging apparatus) according to an embodiment of the invention, and FIG. 6 is a block diagram showing the configuration of the camera system 10. The configuration of the camera system 10 will be described below appropriately with reference to these drawings. The camera system 10 includes a camera body 100 (a device body), an interchangeable lens 200 (an imaging optical system), and an external grip 300 (an external device or an external grip) that is to be attached or detached to or from the camera body 100.

Figure 1:
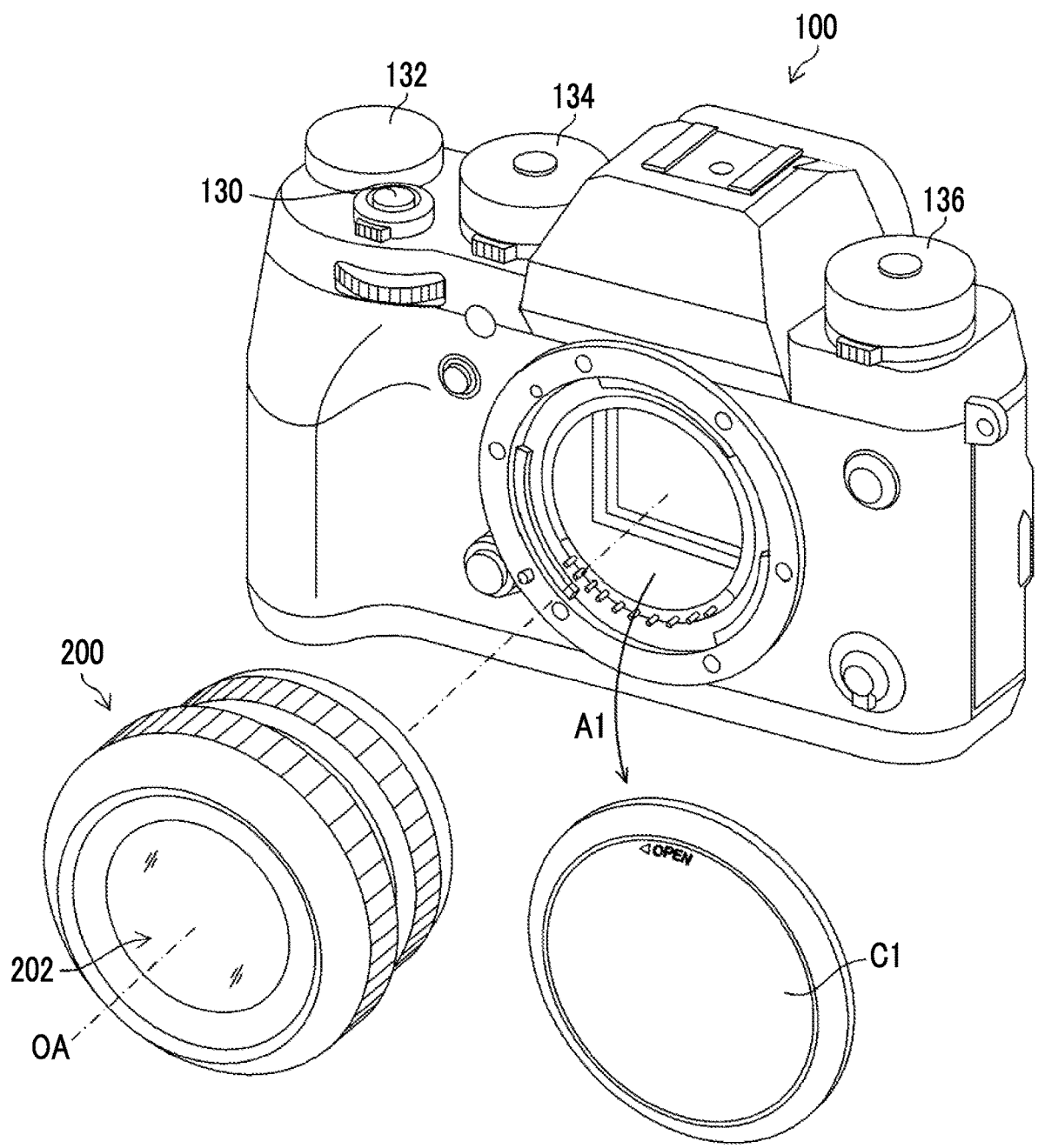
FIG. 1 is a perspective view showing the appearances of a camera body and an interchangeable lens.

FIG. 1 is a perspective view showing the appearances of the camera body 100 and the interchangeable lens 200. The camera body 100 comprises a release button 130, a dial 132 for exposure correction, a dial 134 for adjusting a shutter speed, and a dial 136 for adjusting international organization for standardization (ISO) sensitivity that are provided on the upper surface thereof. Since a cap C1 for protecting a mount portion is mounted on the front surface of the camera body 100 in a case where the interchangeable lens 200 is not mounted, the cap C1 needs to be detached in the direction of an arrow A1 to mount the interchangeable lens 200. Accordingly, terminals provided on both the camera body 100 and the interchangeable lens 200 are in contact with each other, so that electric power can be supplied and the camera body 100 and the interchangeable lens 200 can communicate with each other. The interchangeable lens 200 comprises a lens 202 having an optical axis OA.

Figure 2:
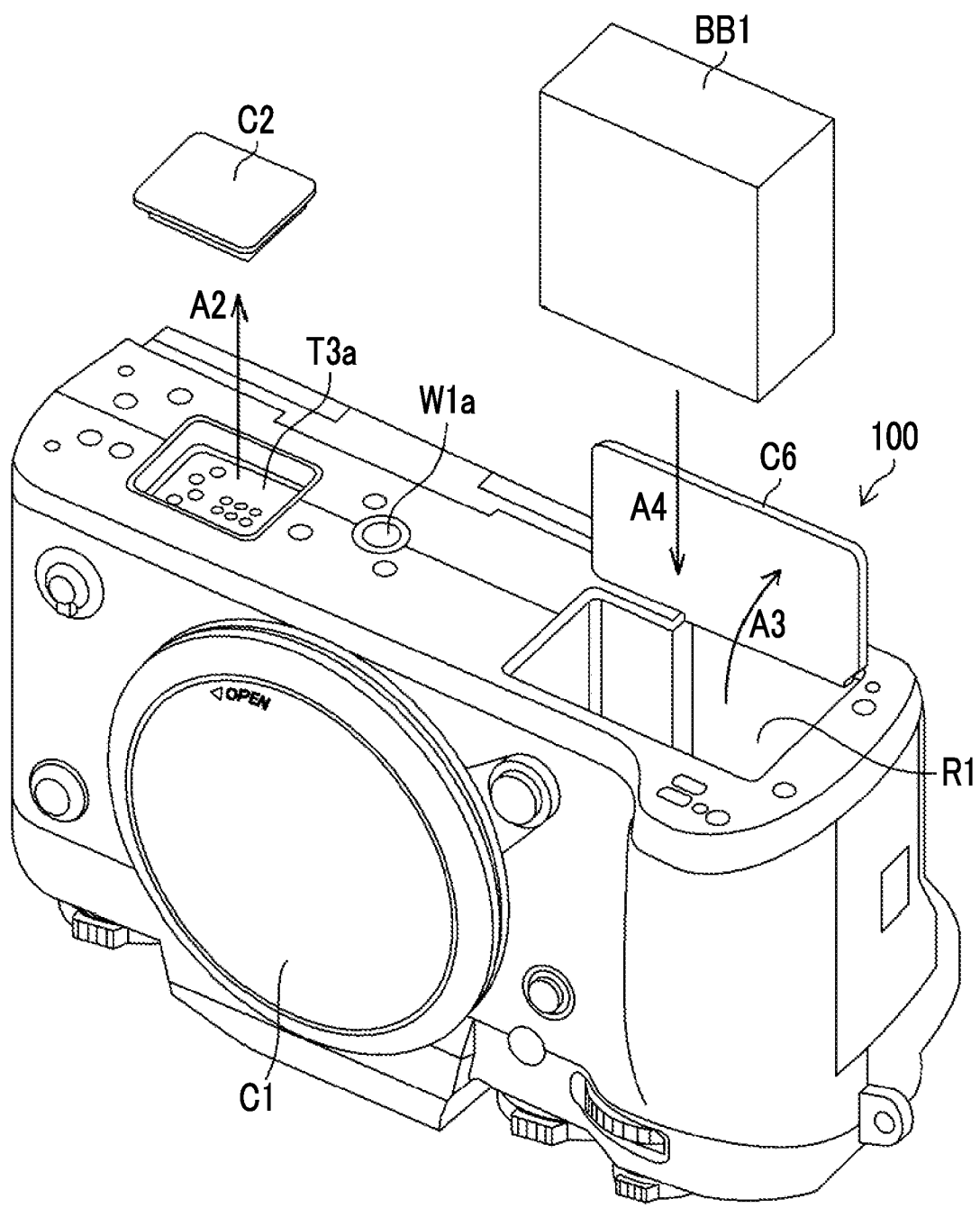
FIG. 2 is a perspective view showing an appearance where a battery is to be mounted in the camera body.

FIG. 2 is a perspective view showing the appearance of the camera body 100 viewed from bottom. A cap C2 is mounted on the bottom of the camera body 100, and a terminal T3a to be connected to the external grip 300 is exposed in a case where the cap C2 is removed as shown by an arrow A2. Further, a lid member C6, which is rotatable about a rotating shaft, is provided at an end portion of the bottom. Since a battery storage chamber R1 is opened in a case where the lid member C6 is rotated in the direction of an arrow A3, a body battery BB1 can be inserted into the battery storage chamber R1 (the direction of an arrow A4). Further, a screw hole W1a, which is used to fix the external grip 300, is provided on the bottom of the camera body 100.

Figure 3:
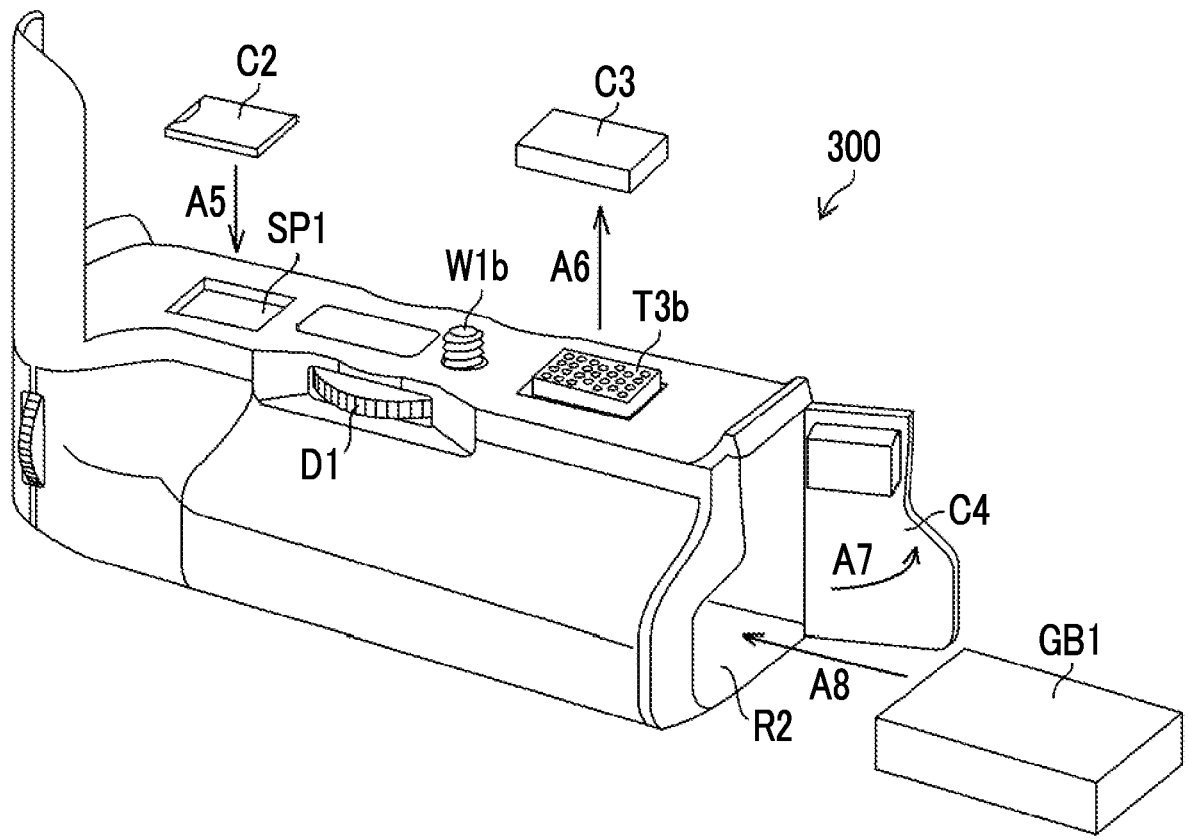
FIG. 3 is a perspective view showing an appearance where a battery is to be mounted in a grip.

FIG. 3 is a perspective view showing the appearance of the external grip 300. A cap storage portion SP1 is provided on the upper surface of the external grip 300, and the cap C2 of the above-mentioned camera body can be stored in the cap storage portion SP1 (the direction of an arrow A5). Further, a terminal T3b to be connected to the camera body 100 is provided on the upper surface of the external grip 300, and the terminal T3*b* is exposed in a case where a cap C3 is detached. A dial D1 and a screw W1*b* are members that are used to fix the external grip 300 to the camera body 100 (see FIG. 5).

A lid member C4 is provided on the side surface of the external grip 300, and a battery storage chamber R2 is opened and a grip battery GB1 can be inserted into the battery storage chamber R2 (the direction of an arrow A8) in a case where the lid member C4 is detached (the direction of an arrow A7). A cover C5 is a member that covers connectors (see FIGS. 4A and 4B).

FIGS. 4A and 4B are partial perspective views showing the side surface of the external grip. FIG. 4A shows a state where the cover C5 is closed, and a connector T2 is exposed as shown in FIG. 4B and a power source cable L2 can be inserted into the connector T2 (the direction of an arrow A10) in a case where the cover C5 is rotated (the direction of an arrow A9) from this state. Accordingly, electric power can be supplied from an AC power source (adapter power source) (not shown) by the insertion of the power source cable L2. The power source cable L2 includes an adapter AD2 (see FIG. 6) that converts an AC power source into a DC (direct current) power source used in the camera body 100.

FIG. 5 is a perspective view showing an appearance where the external grip 300 is to be fixed to the camera body 100 in the camera system 10. FIG. 5 shows a state where the cap C1 is mounted on the camera body 100.

In a case where the dial D1 is rotated (the direction of an arrow A12) to screw the screw W1*b* into the screw hole W1*a*, which is provided on the bottom of the camera body 100, in a state where the camera body 100 approaches the external grip 300 (the direction of an arrow A11) until coming into contact with the external grip 300, the external grip 300 is fixed to the camera body 100.

Further, a cover C7 for protecting connectors is provided on the left side surface of the camera body 100. In a case where the cover C7 is opened (the direction of an arrow A13) and a connector is exposed, a power source cable L1 can be inserted into the connector (the direction of an arrow A14). Accordingly, electric power can be supplied from an AC power source (adapter power source) (not shown) by the insertion of the power source cable L1. The power source cable L1 includes an adapter AD1 (see FIG. 6) that converts an AC power source into a DC power source used in the camera body 100, as in the power source cable L2.

<Configuration of Camera System>

FIG. 6 is a block diagram showing the configuration of the camera system 10. As described above, the camera system 10 includes the camera body 100, the interchangeable lens 200, and the external grip 300.

<Configuration of Interchangeable Lens>

The interchangeable lens 200 includes a lens 202, which includes a zoom lens 202*a* and a focus lens 202*b*, and a stop 206. The camera body 100 comprises an imaging element 102 (imaging element), an analog front end (AFE) 104, an A/D (analog to digital) converter 106, a digital signal processor (DSP) 108, an image processing unit 110, a memory 112, a monitor 114, an auto exposure (AE)/auto white balance (AWB) detection circuit 116, a system large scale integration (LSI) 120, and an operation unit 128.

The lens 202 of the interchangeable lens 200 is a lens that is provided to be movable along the optical axis OA at the time of zooming and focusing. Only one zoom lens 202*a* and only one focus lens 202*b* are shown in FIG. 6, but each of the zoom lens 202*a* and the focus lens 202*b* may be composed of a plurality of lenses. The stop 206 includes an aperture that is formed on the optical axis OA by a plurality of stop leaf blades, and adjusts exposure by moving the positions of the stop leaf blades to adjust the size of an aperture. A lens drive unit 208 includes a motor (not shown), and drives the zoom lens 202*a*, the focus lens 202*b*, and the stop 206 according to a command output from the camera body 100.

<Configuration of Camera Body>

The imaging element 102 is, for example, a charge coupled device (CCD) type imaging element or a complementary metal-oxide semiconductor (CMOS) type imaging element, and the optical image of a subject is formed on the imaging element 102 by the lens 202. A plurality of pixels including color filters are arranged on an imaging surface in the form of a matrix and the imaging element 102 takes the image of the subject by photoelectrically converting light, which is incident from the subject, on each pixel. Imaging signals output from the imaging element 102 are input to the AFE 104, and are amplified after noises are removed from the imaging signals by sampling two correlation pile. The imaging signals, which are amplified after noises are removed from the imaging signals by the AFE 104, are converted into digital image data by the A/D converter 106 and the digital image data is output to the DSP 108. In a case where the imaging element 102 is a CMOS type imaging element, the A/D converter 106 is often built in the imaging element 102.

The DSP 108 functions as an image quality-correction processing circuit that performs signal processing, such as gradation-correction processing or gamma-correction processing, on the input image data or a compression/expansion processing circuit that compresses and/or expands the image data into a format, such as Joint Photographic Experts Group (JPEG). Further, the image data on which various kinds of correction processing are performed by the DSP 108 is input to the image processing unit 110, and image processing, such as contour-enhancement processing, is further performed on the image data. The image data on which the image processing is performed by the image processing unit 110 can be stored in the memory 112 and can be displayed on the monitor 114.

An AF (auto focus) detection circuit 118 is a circuit that detects a focal length on the basis of the image data output from the DSP 108, and outputs a focus evaluation value that is obtained by extracting high-frequency components from an AF detection region set in the image data and integrating and accumulating the high-frequency components. Then, the AF detection circuit 118 automatically performs focusing by allowing the focus lens 202*b* to move along the optical axis OA on the basis of the focus evaluation value so that contrast in the AF detection region becomes maximum. Focus control using a phase difference method may be performed instead of focus control using such a contrast method. In a case where focus control using a phase difference method is to be performed, the focus lens 202*b* is controlled so that the amount of defocus obtained from phase difference data calculated using pixels positioned in a focus region of the image data and having a plurality of phase differences becomes zero. In a case where a phase difference method is to be used, an imaging element for phase difference AF may be separately provided and AF processing may be performed using a phase difference detected by the imaging element for phase difference AF.

The AE/AWB detection circuit 116 detects whether or not white balance is suitable for imaging on the basis of the image data output from the DSP 108, and detects exposure suitable for imaging. Then, the AE/AWB detection circuit 116 adjusts the size of the aperture of the stop 206, the speed of an electronic shutter of the imaging element 102, or the like so that exposure becomes suitable.

The system LSI 120 controls the respective parts of the camera body 100 overall according to a user's operation that is input through the operation unit 128. The system LSI 120 performs automatic focusing by the AF detection circuit 118 according to, for example, the operation of the release button 130 (a halfway-push operation for pushing the release button 130 to the middle of a stroke, or the like) and automatically adjusts exposure by the AE/AWB detection circuit 116.

<Configuration of Camera Body (Portion Corresponding to Power Source)>

Next, the configuration of the camera body 100 corresponding to the power source will be described. A power source of the camera body 100 and a power source of the external grip 300 are centrally managed by a power source monitoring unit 122 (an order-of-priority setting unit, a power source-switching preparation unit, a power source-switching control unit, and a power source detection unit). The power source monitoring unit 122 has a function as a computer performing a method of switching a power source according to an embodiment of the invention. Specifically, the power source monitoring unit 122 detects the power sources (the battery power source and the adapter power source) of the camera body 100 and the external grip 300, monitors voltage levels, and controls a body-side power source circuit 126 (an order-of-priority setting unit, a power source-switching preparation unit, a power source-switching control unit, and a power source detection unit) and a grip-side power source circuit 302 (an order-of-priority setting unit, a power source-switching preparation unit, a power source-switching control unit, and a power source detection unit) by using software (a computer-readable code of a program performing a method of switching a power source according to the embodiment of the invention) stored in a software storage unit 124 (storage unit) to perform power source switching preparation and power source switching control. The details of these kinds of processing will be described later.

The body-side power source circuit 126 supplies battery power source and adapter power source to the respective parts of the camera body 100 by the control of the power source monitoring unit 122. The battery power source of the camera body 100 is supplied from the body battery BB1, and the adapter power source is supplied from an AC power source (not shown) through a connector T1 and the power source cable L1. A capacitor CP1 is connected between the power source monitoring unit 122 and the body-side power source circuit 126, and electric charges accumulated due to the normal use of the camera system 10 can be used as a power source at the time of the power source switching preparation and the power source switching control. The software storage unit 124 stores software required for the power source switching preparation and the power source switching control. For example, a button-type battery and a coin-type battery can be used as a backup battery RB1, and the backup battery RB1 can be normally used as a backup power source for each of the parts (a clock, a memory, and the like (not shown)) of the camera body 100. However, the backup battery RB1 can be used as a power source at the time of the power source switching preparation and the power source switching control by the control of the power source monitoring unit 122.

<Configuration of External Grip (Portion Corresponding to Power Source)>

Next, the configuration of the external grip 300 corresponding to the power source will be described. The grip-side power source circuit 302 supplies battery power source and adapter power source to the respective parts of the camera body 100 by the control of the power source monitoring unit 122. The battery power source is supplied from the grip battery GB1, and the adapter power source is supplied from an AC power source (not shown) through the connector T2 and the power source cable L2. The power source of the external grip 300 is supplied to the camera body 100 through the terminal T3b of the external grip 300 and the terminal T3a of the camera body 100. A capacitor CP2 is connected between the power source monitoring unit 122 and the grip-side power source circuit 302, and electric charges accumulated due to the normal use of the camera system 10 can be used as a power source at the time of the power source switching preparation and the power source switching control. For example, a button-type battery and a coin-type battery can be used as a backup battery RB2, and the backup battery RB2 can be normally used as a backup power source for each of the parts of the external grip 300. However, the backup battery RB2 can be used as a power source at the time of the power source switching preparation and the power source switching control by the control of the power source monitoring unit 122. A motor for high-speed drive and the like can be mounted on the external grip 300 other than the above-mentioned elements corresponding to the power source.

<Hardware Component, Such as Power Source Monitoring Unit>

In this embodiment, the power source monitoring unit 122, the body-side power source circuit 126, and hardware components of the grip-side power source circuit 302 for performing various kinds of processing (the setting of the order of priority, the power source switching preparation, the power source switching control, the detection of a power source, and the like) are various processors to be described below. The various processors include: a central processing unit (CPU) that is a general-purpose processor performing various kinds of processing by software (program); a programmable logic device (PLD), which is a processor of which circuit configuration can be changed after manufacture, such as a field programmable gate array (FPGA); a dedicated electrical circuit, which is a processor having circuit configuration designed exclusively for specific processing, such as an application specific integrated circuit (ASIC); and the like.

The functions of the power source monitoring unit 122, the body-side power source circuit 126, and the grip-side power source circuit 302 may be achieved by one of these various processors, or may be achieved by two or more of the same kind or different kinds of processors (for example, a plurality of FPGAs or a combination of a CPU and an FPGA). Further, the plurality of functions may be achieved by one processor. First, there is a form where one or more CPUs and software are combined to form one processor as typified by a computer, such as a client or a server, and this processor achieves a plurality of functions, as an example where a plurality of functions are achieved by one processor. Second, there is a form where a processor achieving the functions of the entire system including a plurality of functions by one integrated circuit (IC) chip as typified by a system on chip (SoC), or the like is used. As described above, various functions are achieved using one or more of the above-mentioned various processors as a hardware component. In addition, the hardware components of these various processors are, more specifically, electrical circuitry that is a combination of circuit elements, such as semiconductor elements.

A non-temporary recording medium, such as an electrically erasable programmable read-only memory (EEPROM), can be used as the software storage unit 124.

<Setting of Order of Priority of Power Source>

Figure 7:
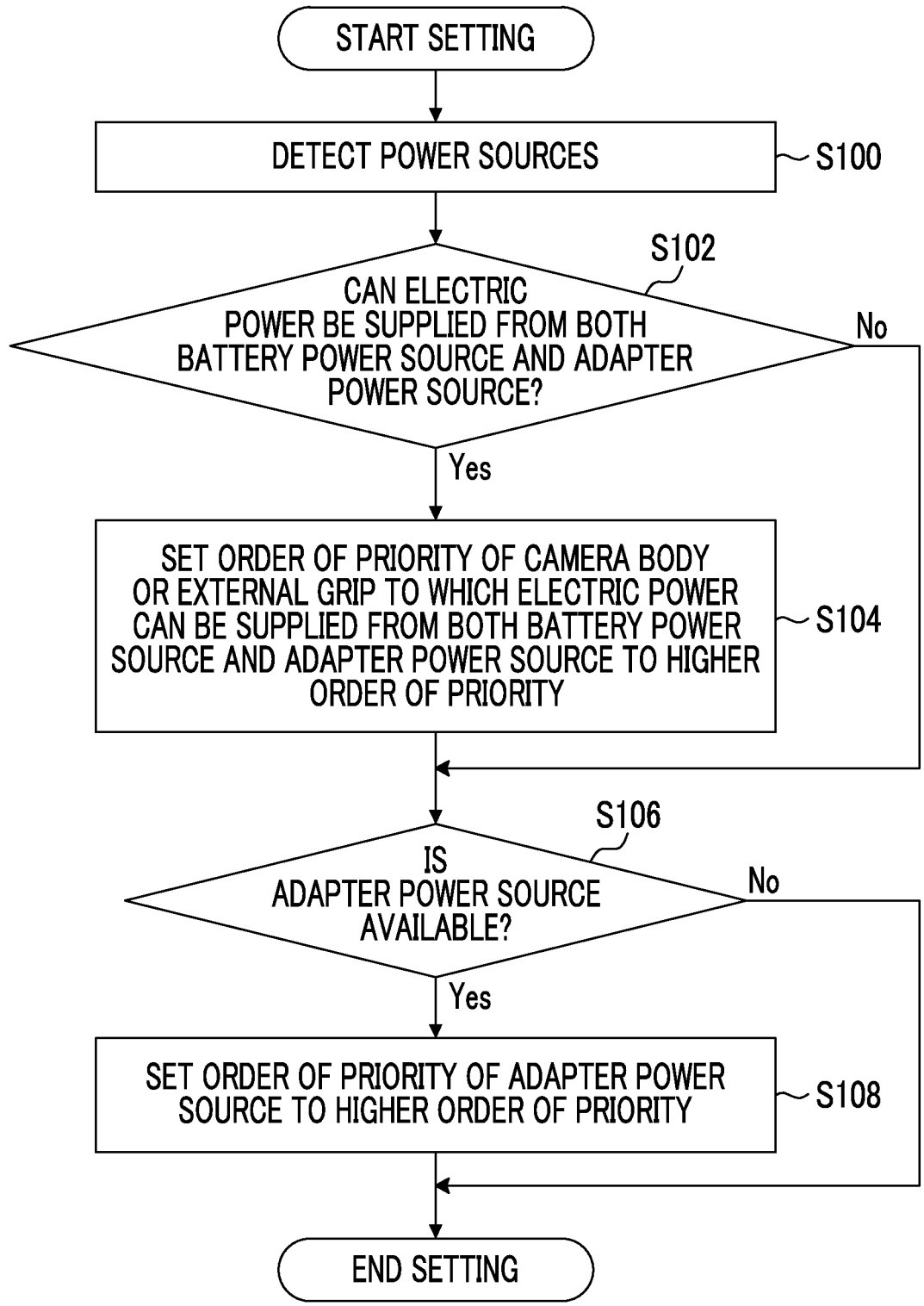
FIG. 7 is a flowchart showing processing for setting the order of priority of a power source.

In the camera system 10, electric power is supplied to the camera body 100 according to the order of priority of a power source (the order of priority of electric power to be supplied). The setting of the order of priority is performed by the control of the power source monitoring unit 122. FIG. 7 is a flowchart showing processing for setting the order of priority (order-of-priority setting step). The order of priority is set for available power sources, and the power sources are used in the order of the order of priority.

In a case where the setting of the order of priority is started, the power source monitoring unit 122 detects the power sources (a battery power source and an adapter power source) of the camera body 100 and the external grip 300 (Step S100) and determines whether or not electric power can be supplied to the camera body 100 and the external grip 300 from both the battery power source and the adapter power source (Step S102). As the result of the determination, if electric power can be supplied to any one of the camera body 100 or the external grip 300 from both the battery power source and the adapter power source (Yes in Step S102), the order of priority of the camera body 100 or the external grip 300 to which electric power can be supplied from both the battery power source and the adapter power source is set to be higher (Step S104). These kinds of processing are to set the order of priority of the camera body 100 or the external grip 300, of which the electric power supply capacity is higher, to a higher order of priority.

Then, it is determined whether or not the adapter power source is available for the camera body 100 and the external grip 300 (Step S106). If the adapter power source is available (Yes in Step S106), the order of priority of the adapter power source is set to be higher than that of the battery power source (Step S108) and the setting ends. Since the battery power source is exhausted by use but the adapter power source is not actually exhausted, the processing of Steps S106 and S108 is to stably supply electric power by setting the order of priority of the adapter power source to a higher order of priority. In a case where a power source is mounted or detached after the camera system 10 starts to be used, the setting of the order of priority may be updated according to the mounting or detachment of the power source.

In a case where the order of priority cannot be set by the above-mentioned processing or a case where setting using the above-mentioned processing is inconvenient, the order of priority having been initially set can be used. FIG. 8 is a table showing an example of initial setting. In initial setting A, the order of priority of the adapter power source is set to be higher than that of the battery power source as in the processing of FIG. 7 and a body-side power source has priority over a grip-side power source. The order of priority in the initial setting may be set on the basis of a criterion different from that of the processing of FIG. 7.

For example, as in initial setting B of FIG. 8, the body-side power source can have priority over the grip-side power source and the order of priority of the battery power source can be set to be higher than that of the adapter power source. In the example of FIG. 8, the order of priority is higher as a numerical value is smaller.

<Power Source Switching (Example 1)>

Next, an example of power source switching according to an embodiment of the invention will be described. FIG. 9 is a table showing the state of a power source of Example 1 of the power source switching and the transition thereof. As shown in FIG. 9, in the initial state in Example 1, only the grip battery (the grip battery GB1 of the external grip 300; the same shall apply hereinafter) is mounted and is used as a main power source (the order of priority: 1) and a body adapter (an AC power source to be supplied to the camera body 100 through the power source cable L2; the same shall apply hereinafter) is mounted later. Accordingly, the order of priority of the body adapter becomes 2.

<Power Source Switching Preparation and Power Source Switching Control (Case 1)>

Figure 10:
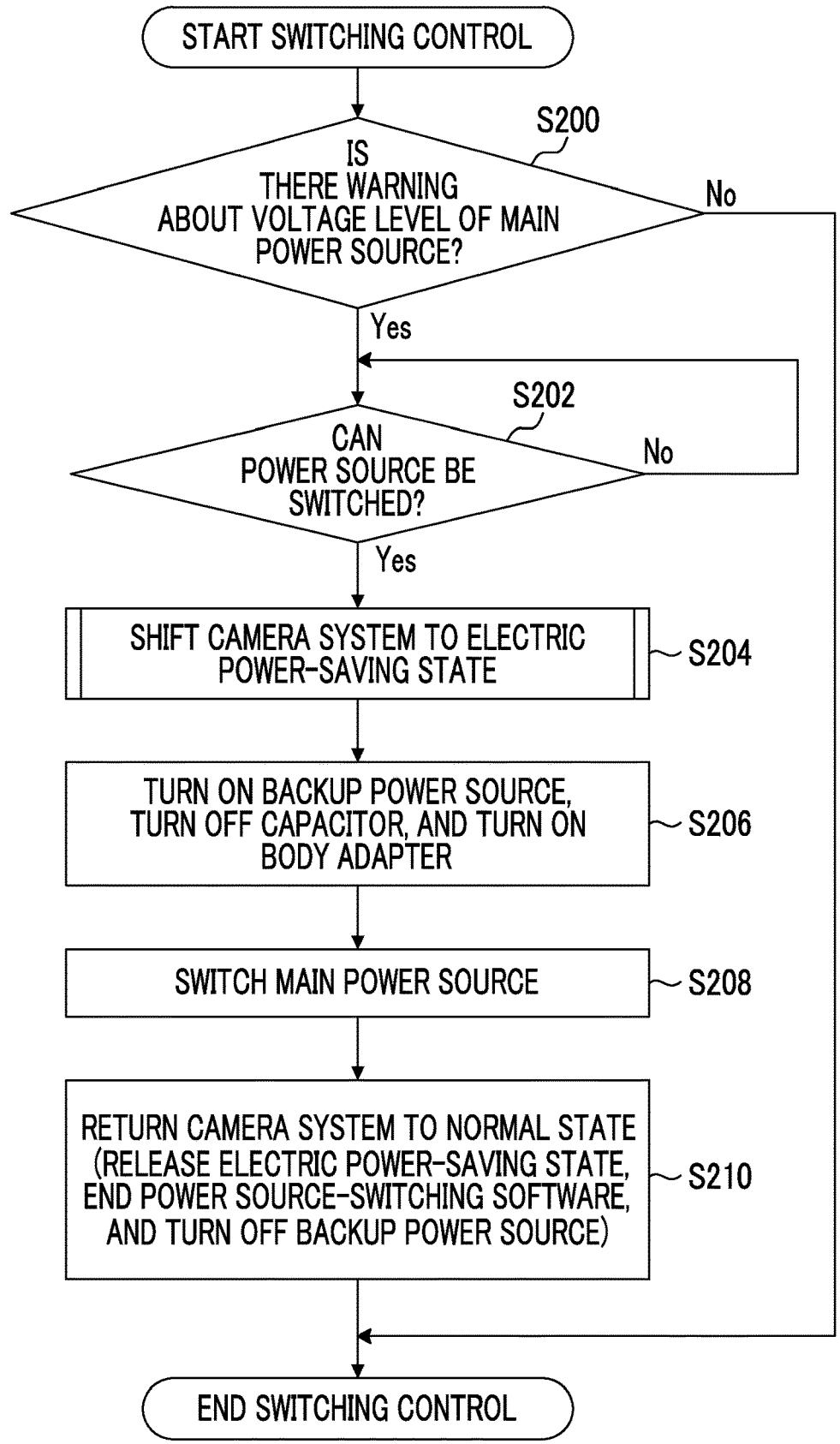
FIG. 10 is a flowchart showing the processing of the power source switching control of Example 1 (Case 1) of the power source switching control.
Figure 11:
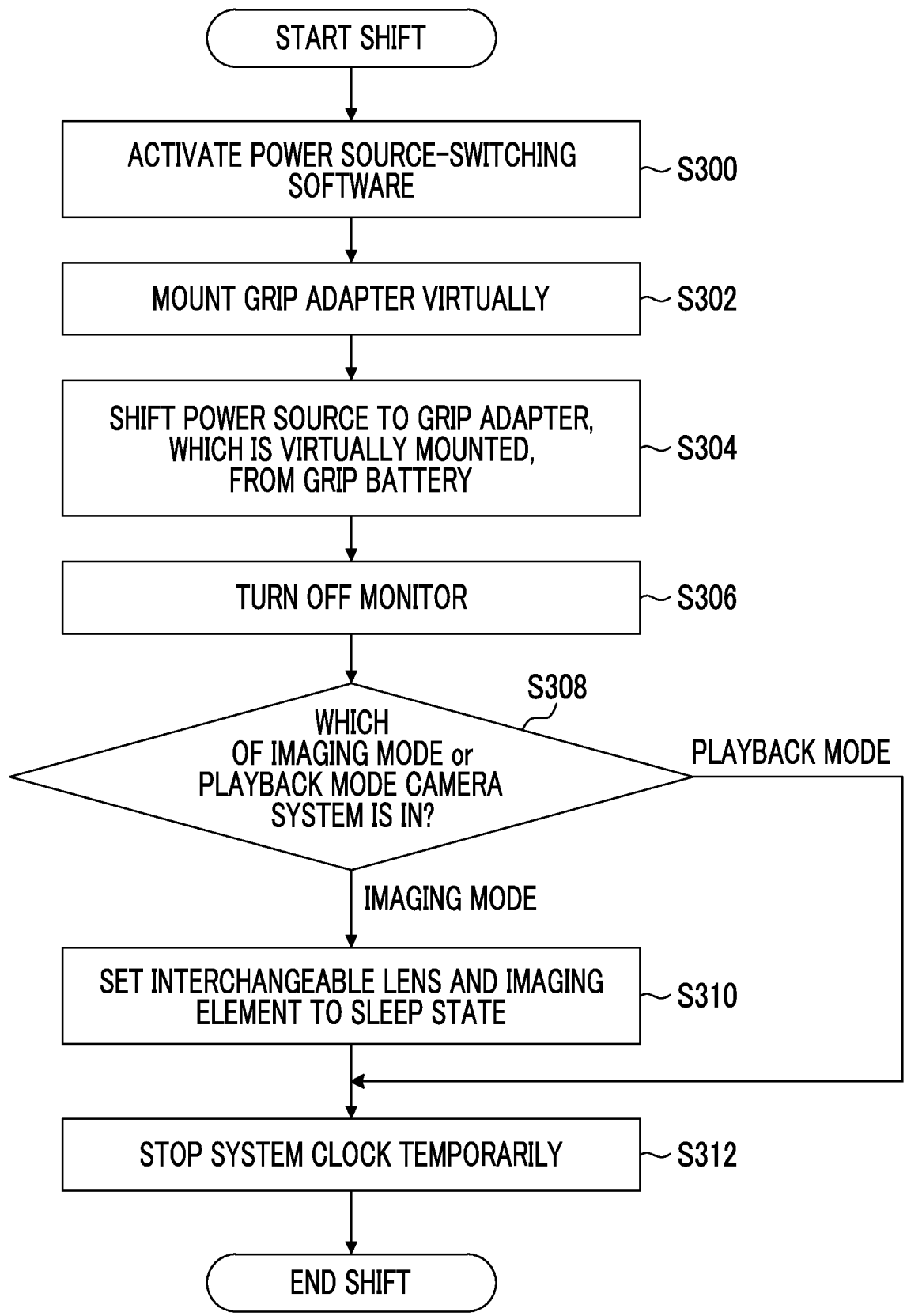
FIG. 11 is a flowchart showing the processing of power source switching preparation of Example 1 (Case 1) of the power source switching control.

FIG. 10 is a flowchart showing the processing of the power source switching control of Example 1 (Case 1) (power source switching-control step), and FIG. 11 is a flowchart showing the processing of the power source switching preparation (Step S204 of FIG. 10; power source switching-preparation step). As described above, the power source monitoring unit 122 performs processing of FIGS. 10 and 11 using the software stored in the software storage unit 124. Further, FIG. 12 is a table showing the state of a power source of Case 1 and the transition thereof. Description will be made appropriately with reference to these drawings.

In a case where the power source switching control is started, it is determined whether or not there is a warning about the voltage level of the main power source (whether or not the voltage level is equal or lower than a threshold value) (Step S200). In Case 1, if the voltage level of the grip battery GB1 as the main power source is lowered by use and becomes equal to or lower than the threshold value, this determination is affirmed (Yes in Step S200; No. 1 of FIG. 12) and it is determined whether or not the camera system 10 is in a state where the main power source can be switched (Step S202). Specifically, while image data is generated (a period until the image data is generated and is recorded in the memory 112 after the imaging element 102 outputs signals), it is determined that "the camera system 10 is not in the state where the main power source can be switched". Accordingly, the corruption or loss of the image data is prevented, so that the power source is smoothly switched. If the camera system 10 is not in the state where the main power source can be switched, the camera system 10 is shifted to an electric power-saving state in a case where the camera system 10 is in a state where the main power source can be switched after the generation of the image data ends (Step S204; power source switching-preparation step, first processing). If the voltage level is higher than the threshold value in Step S200, the main power source is not switched and the processing ends.

In a case where the shift of the camera system 10 to the electric power-saving state is started, the power source monitoring unit 122 activates power source-switching software (software stored in the software storage unit 124) (Step S300). Since it is detected in Case 1 that the body adapter is available as shown in FIG. 9, a grip adapter (an AC power source to be supplied to the external grip 300 through the power source cable L1; the same shall apply hereinafter) is virtually mounted (Step S302 of FIG. 11; No. 2 of FIG. 12). In a state where the grip adapter is virtually mounted, the following processing is performed using electric charges accumulated in the capacitor CP2 of the external grip 300.

In a case where the grip adapter is virtually mounted in Step S302, a power source is shifted to the grip adapter, which is virtually mounted, from the grip battery GB1 (Step S304). Then, the monitor 114 is turned off (Step S306 of FIG. 11; No. 3 of FIG. 12) by electric power supplied from the grip adapter, which is virtually mounted, and the interchangeable lens 200 and the imaging element 102 are set to a sleep state (Step S310 of FIG. 11; No. 3 of FIG. 12) if the camera system 10 is in an imaging mode ("if it is determined in Step S308 that the camera system 10 is in an imaging mode"). If the camera system 10 is in a playback mode, the processing of Step S310 is not performed. After that, a system clock is temporarily stopped (Step S312 of FIG. 11; No. 3 of FIG. 12). Since the first processing is performed in the switching preparation (power source switching-preparation step) in Example 1 to shift the camera system 10 to the electric power-saving state, a power source can be smoothly switched even in the case of a capacitor having small capacitance.

In a case where the shift of the camera system 10 to the electric power-saving state ends, the processing returns to the flowchart of FIG. 10, the backup power source (backup battery RB2) of the external grip 300 is turned on (a state where electric power can be supplied, the same shall apply hereinafter), the capacitor CP2 is turned off (the supply of electric power ends; the same shall apply hereinafter), and the body adapter is turned on (Step S206 of FIG. 10; No. 4 of FIG. 12). The processing of Step S206 is second processing of the switching preparation (power source switching-preparation step). In this case, the above-mentioned virtual mounting state is maintained. Since the camera system 10 is shifted to a switchable state (first switchable state) where electric power can be supplied from both the grip adapter virtually mounted in Step S304 and the body adapter turned on in Step S206 by this second processing, it is possible to smoothly switch a power source while preventing instantaneous interruption.

In a case where the camera system 10 is shifted to the switchable state by the processing of Step S206, the main power source is switched to the body adapter (Step S208 of FIG. 10, No. 5 of FIG. 12; power source switching-control step) and the camera system 10 is then returned to a normal state (Step S210 of FIG. 10; No. 6 of FIG. 12). In the return of the camera system 10 to the normal state, the electric power-saving state is released (the display of image data on the monitor 114 is resumed, the sleep states of the interchangeable lens 200 and the imaging element 102 are released, and the system clock is activated again), the backup power source (backup battery RB2) of the external grip 300 is turned off, and the virtual mounting state of the grip adapter is released.

As described above, in Example 1 (Case 1) of the power source switching, the switching preparation (the first processing and the second processing) for shifting the camera system 10 to the electric power-saving state and the first switchable state is performed and the main power source is switched according to the order of priority in that state. Accordingly, even though power source supply lines are shut off from each other between the camera body 100 and the external grip 300 on which the battery power source and the adapter power source can be mounted, it is possible to smoothly switch a power source while preventing instantaneous interruption.

<Power Source Switching Preparation and Power Source Switching Control (Case 2)>

Next, another case (Case 2) of Example 1 of the power source switching will be described. In the above-mentioned case 1, the capacitor CP2 of the external grip 300 is used as a power source of the power source switching preparation and the backup battery RB2 of the external grip 300 is used as a power source at the time of the power source switching.

Figure 13:
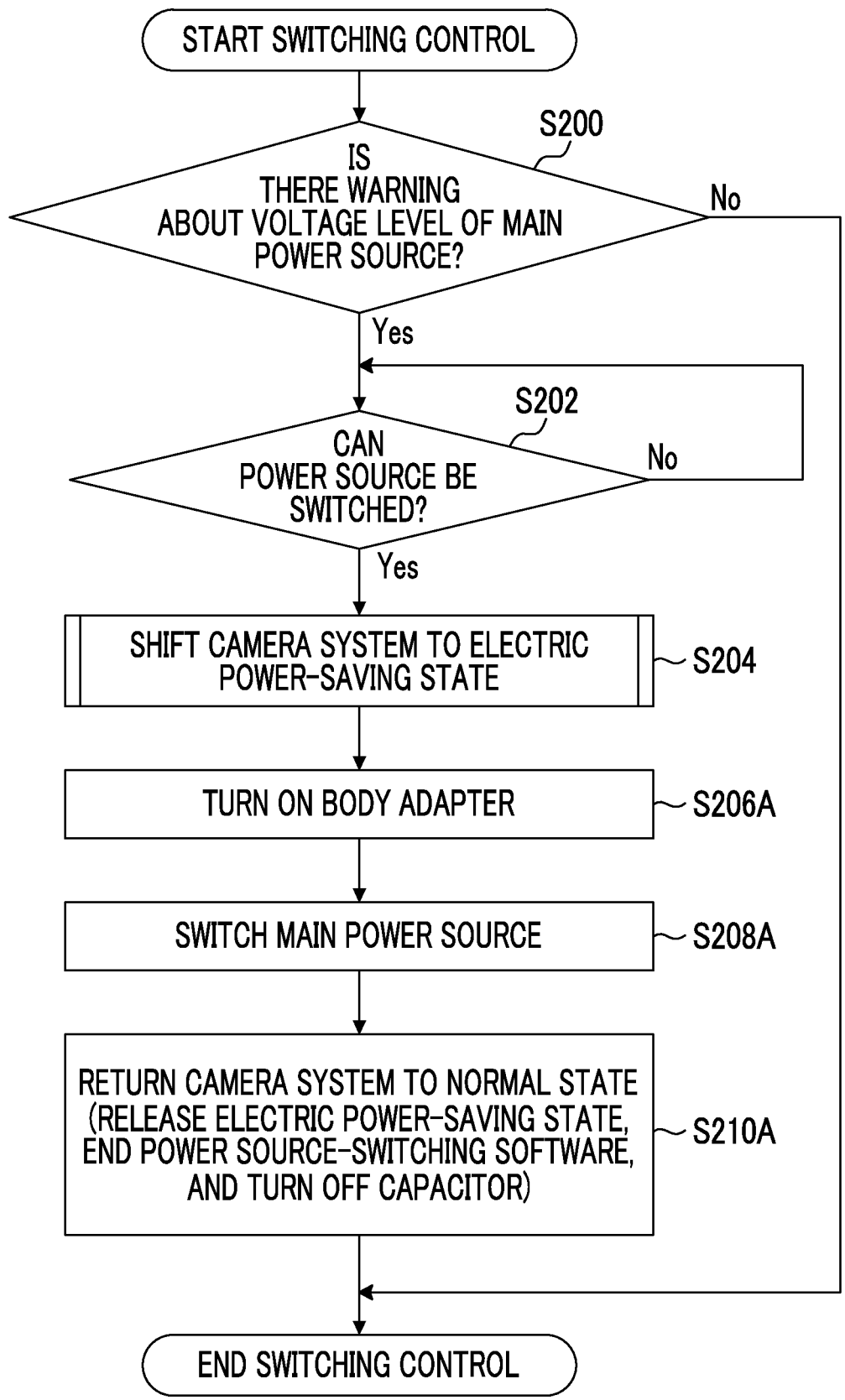
FIG. 13 is a flowchart showing the processing of power source switching control of Example 1 (Case 2) of the power source switching control.

However, in Case 2, the capacitor CP2 is used even as a power source at the time of the power source switching. In this case, processing to be performed until the power source switching preparation is the same as that of Case 1 (Steps S200 to S204 of FIG. 10, FIG. 11, and Nos. 1 to 3 of FIG. 12), and processing to be performed after the power source switching is different from that of Case 1. For this reason, the processing of Steps S200 to S204 in a flowchart of FIG. 13 showing processing of Case 2 will be denoted by the same step numbers as those in FIG. 10, and the detailed description thereof will be omitted. Further, since Nos. 1 to 3 in a table of FIG. 14 showing the state of a power source and the transition thereof are the same as those of FIG. 12, the detailed description thereof will be omitted.

In the flowchart of FIG. 13, the body adapter is turned on (Step S206A; No. 4 of FIG. 14) in a case where the shift of the camera system 10 to the electric power-saving state (the first processing of the switching preparation) ends by the processing performed until Step S204. In this case, the above-mentioned virtual mounting state is maintained. Since the camera system 10 is shifted to the switchable state (first switchable state) where electric power can be supplied from both the grip adapter virtually mounted in Step S304 (see FIG. 11) and the body adapter turned on in Step S206 by this processing (the second processing of the switching preparation), it is possible to smoothly switch a power source while preventing instantaneous interruption.

Then, in this switchable state, the main power source is switched to the body adapter (Step S208A of FIG. 13, No. 5 of FIG. 14) and the camera system 10 is then returned to a normal state (Step S210A of FIG. 13; No. 6 of FIG. 14). In the return of the camera system 10 to the normal state, the electric power-saving state is released (the display of image data on the monitor 114 is resumed, the sleep states of the interchangeable lens 200 and the imaging element 102 are released, and the system clock is activated again), the capacitor CP2 of the external grip 300 is turned off (the supply of electric power ends), and the virtual mounting state of the grip adapter is released.

As described above, even in Case 2 of Example 1, it is possible to smoothly switch a power source while preventing instantaneous interruption as in Case 1.

<Power Source Switching (Example 2)>

Next, another example of power source switching will be described. A case where only the grip battery is mounted at first and the body adapter is mounted later has been described in the above-mentioned example 1 (see FIGS. 9 and 12), but a case where a plurality of power sources are mounted from the first as shown in FIG. 15 will be described in Example 2.

In Example 2, the body adapter, the grip battery, and the grip adapter are mounted in the initial state as shown in No. 1 of FIG. 15, the order of priority of "a side to which electric power can be supplied from both the battery power source and the adapter power source", that is, the external grip 300 is set high in the setting of the order of priority (Steps S102 and S104 of FIG. 7), and the adapter power source (grip adapter) is available in the external grip 300. Accordingly, the order of priority of the adapter power source is set high. Therefore, the order of priority is set in the order of the grip adapter, the grip battery, and the body adapter as shown in No. 2 of FIG. 15, so that the grip adapter is used as the main power source. After that, the loss of a power source occurs in the grip adapter as the main power source for any reason (the power source cable L2 is accidentally disconnected, or the like) as shown in No. 3 of FIG. 15. In a case an electric power supply line of the battery power source and an electric power supply line of the adapter power source are shut off from each other in the external grip 300, instantaneous interruption may occur in the power source switching in the external grip 300 (the same applies to the case of the power source switching in the camera body 100). However, it is possible to smoothly switch a power source while preventing instantaneous interruption as described below by the power source switching control according to the embodiment of the invention.

<Power Source Switching Preparation and Power Source Switching Control (Case 1)>

Power source switching preparation and power source switching control (Case 1) in this state will be described. In Case 1, the switching of the camera system 10 to the grip battery having the next highest order of priority is performed since the loss of a power source has occurred in the grip adapter as the main power source for any reason. In Case 1 of Example 2, as in Case 1 of Example 1, electric charges accumulated in the capacitor CP2 are used as a power source at the time of the power source switching preparation and the backup battery RB2 is used as a power source at the time of the power source switching.

Figure 16:
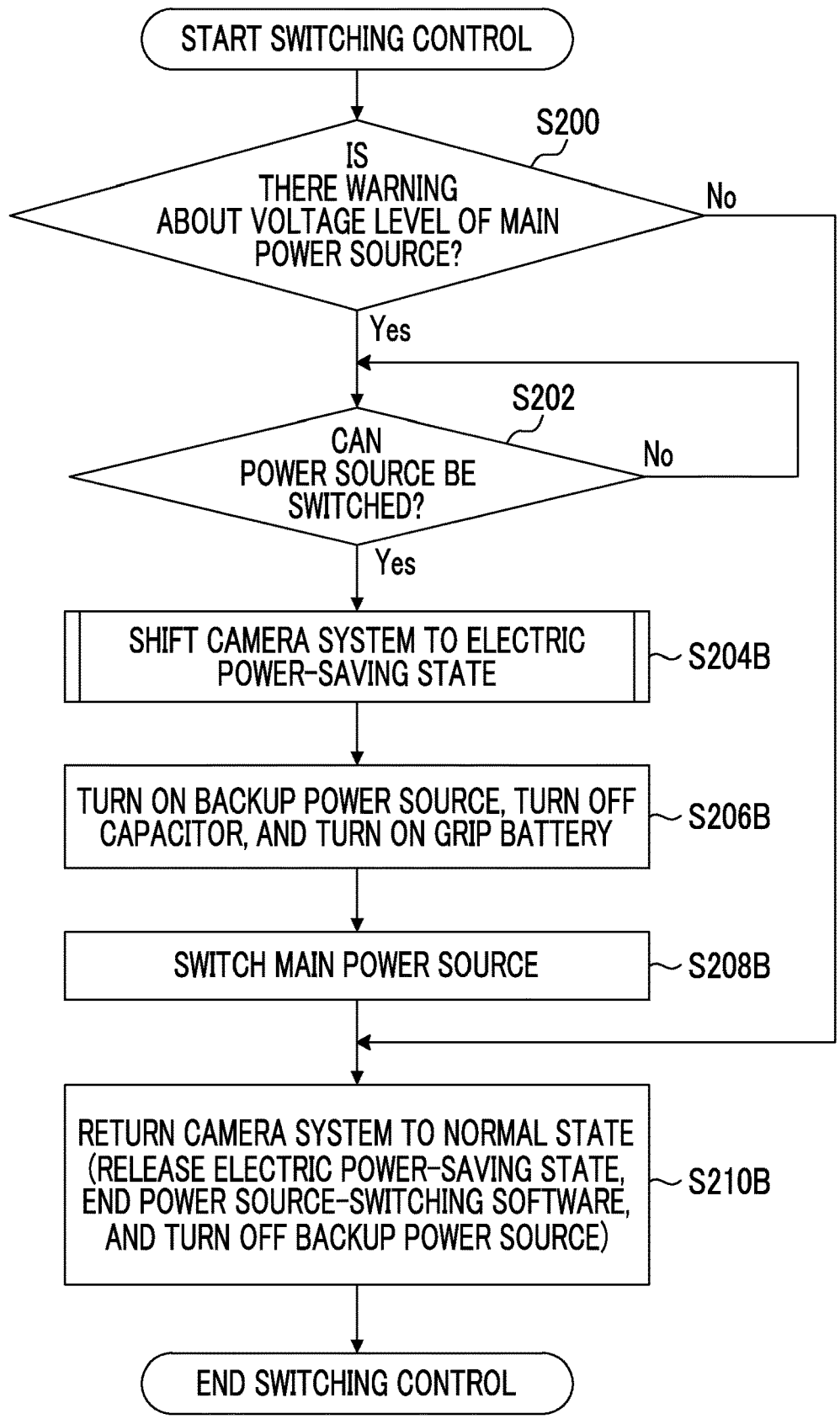
FIG. 16 is a flowchart showing the processing of power source switching control of Example 2 (Case 1) of the power source switching control.
Figure 17:
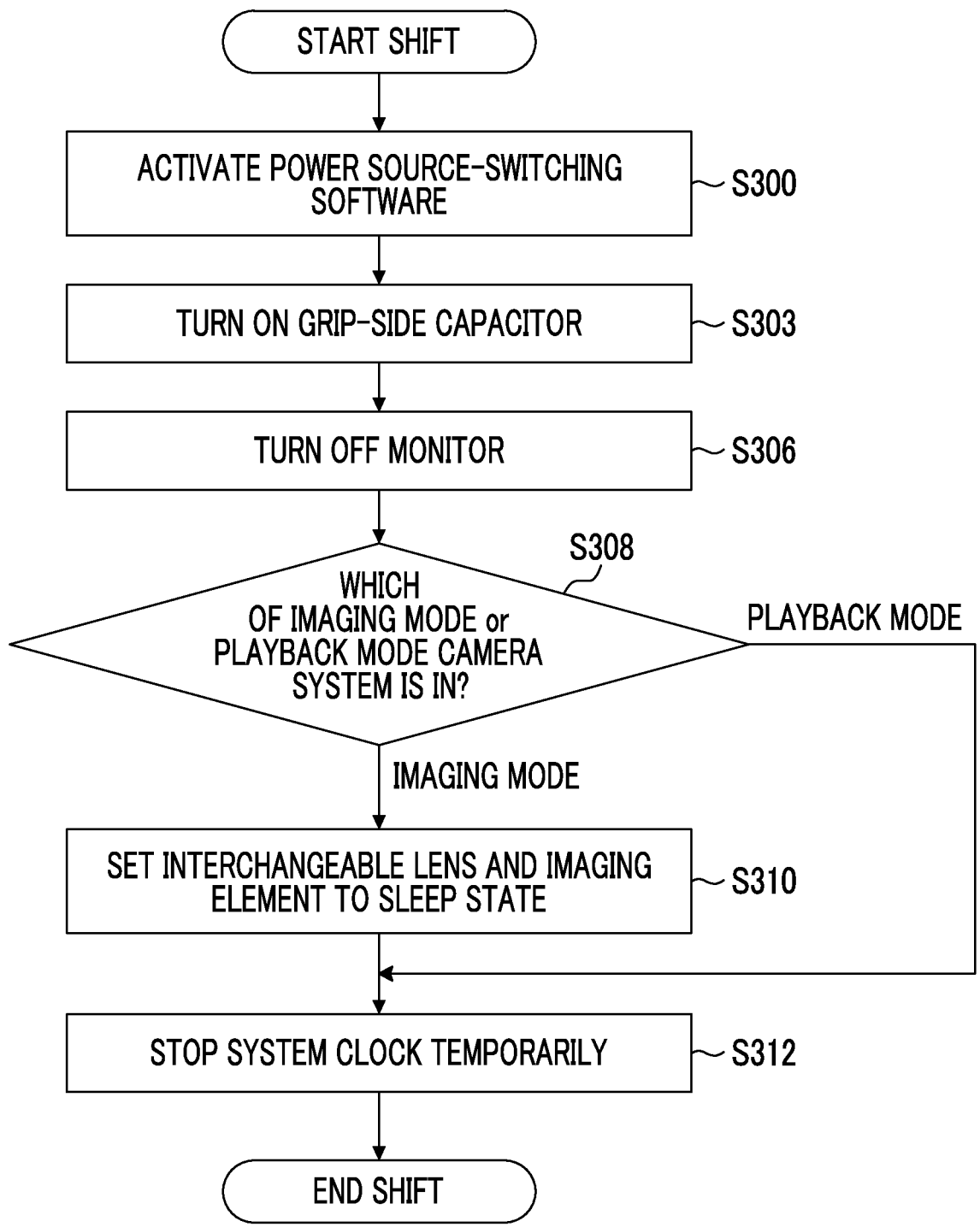
FIG. 17 is a flowchart showing the processing of power source switching preparation of Example 2 (Case 1) of the power source switching control.

FIG. 16 shows a flowchart power source switching control (a method of switching a power source, a power source switching-preparation step, and a power source switching-control step) of Case 1 of Example 2. The same processing of FIG. 16 as the processing of FIG. 10 will be denoted by the same step numbers as those of FIG. 10 and the detailed description thereof will be omitted. Processing to be performed until Step S202 in the flowchart of FIG. 16 is the same as that of FIG. 10, and the shift of the camera system 10 to the electric power-saving state (Step S204B; power source switching-preparation step, first processing) is performed according to a flowchart of FIG. 17. The same processing of FIG. 17 as the processing of FIG. 11 will be denoted by the same step numbers as those of FIG. 11 and the detailed description thereof will be omitted. Further, the state of a power source and the transition thereof are shown in a table of FIG. 18.

In a case where power source-switching software (software stored in the software storage unit 124) is activated in Step S300, a grip-side capacitor (the capacitor CP2 of the external grip 300) is turned on in Step S303 and the shift of the camera system 10 to the electric power-saving state is performed (see No. 2 of FIG. 18) in Case 1 of Example 2. Specifically, as in the description of FIG. 11, the monitor 114 is turned off (Step S306), the interchangeable lens 200 and the imaging element 102 are set to a sleep state (Step S310), a system clock is temporarily stopped (Step S312) to end the shift of the camera system 10 to the electric power-saving state, and the processing returns to the flowchart of FIG. 16.

In a case where the shift of the camera system 10 to the electric power-saving state ends, the capacitor CP2 used for the shift of the camera system 10 is turned off, the backup power source (backup battery RB2) of the external grip 300 is turned on as the grip adapter (adapter power source), and the grip battery GB1 is turned on as the grip battery (battery power source) (Step S206B of FIG. 16, No. 3 of FIG. 18). The camera system 10 is shifted to the switchable state (third switchable state) where electric power can be supplied from both the grip battery GB1 and the backup battery RB2 as the grip adapter by this processing (the second processing of the switching preparation), and the main power source is switched to the grip battery in this state (Step S208B of FIG. 16, No. 4 of FIG. 18; power source switching-control step).

In a case where the switching of the main power source ends, the camera system 10 returns to a normal state (Step S210B of FIG. 16; No. 5 of FIG. 18). Specifically, the electric power-saving state set at the time of the power source switching preparation is released, the power source-switching software ends, and the backup power source (backup battery RB2) is turned off.

As described above, in Case 1 of Example 2, as in Example 1, the switching preparation (the first processing and the second processing) for shifting the camera system 10 to the electric power-saving state and the third switchable state is performed and the main power source is switched according to the order of priority in that state. Accordingly, it is possible to smoothly switch a power source while preventing instantaneous interruption.

<Power Source Switching Preparation and Power Source Switching Control (Case 2)>

Figure 19:
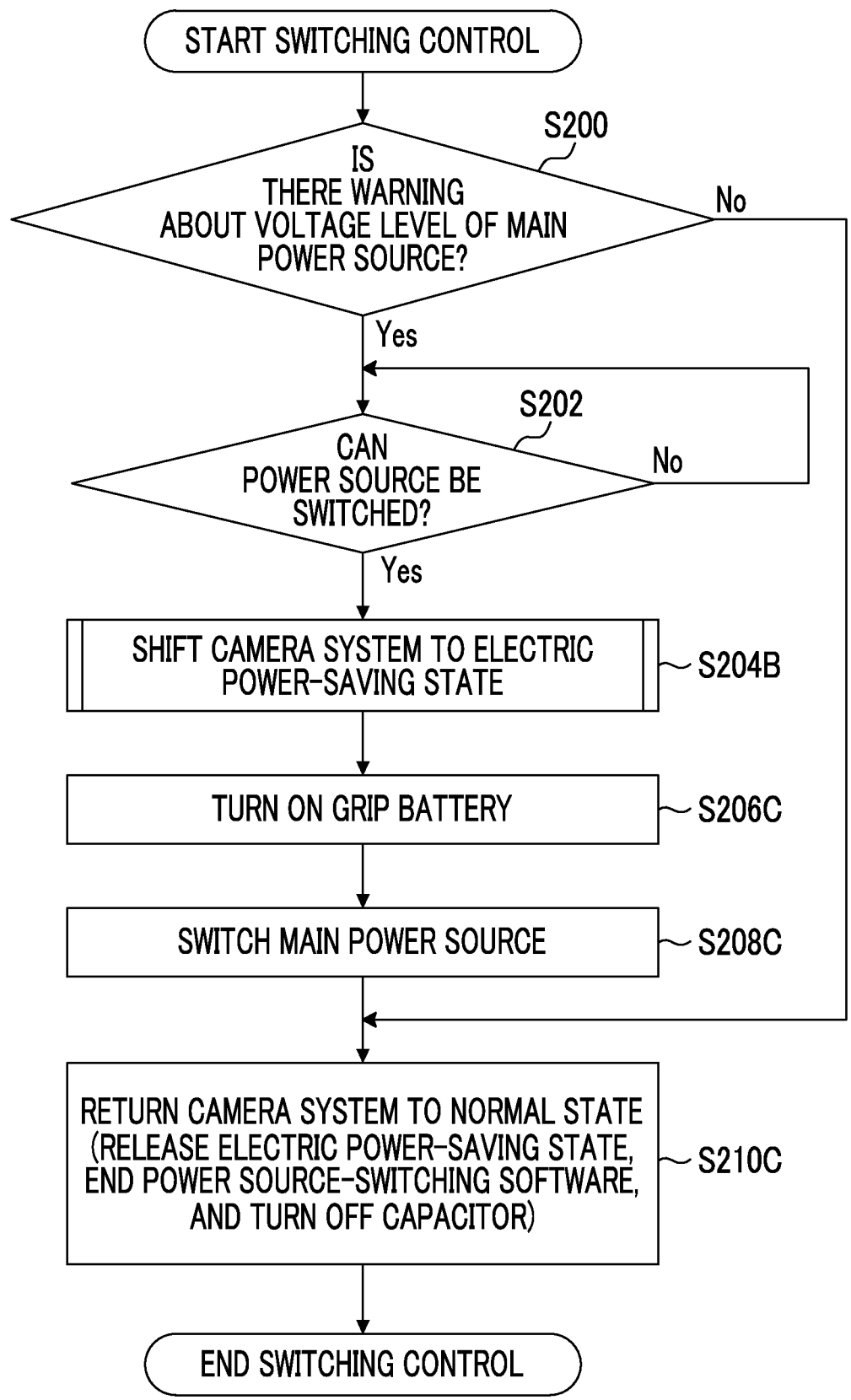
FIG. 19 is a flowchart showing the processing of power source switching control of Example 2 (Case 2) of the power source switching control.

Next, another aspect (Case 2) of the power source switching preparation and the power source switching control in the state of Example 2 will be described. In Case 1 of Example 2, the capacitor CP2 is used as a power source for the shift of the camera system 10 to the electric power-saving state and the backup battery RB2 is used as a power source for the power source switching. However, in Case 2, the capacitor CP2 is used as the grip adapter (adapter power source) even in the power source switching. In this case, processing to be performed until the shift of the camera system 10 to the electric power-saving state is the same as that of Case 1 (Steps S200 to S204B of FIG. 16, FIG. 17, and Nos. 1 and 2 of FIG. 18), and processing for shifting the camera system 10 to the electric power-saving state is different from that of Case 1. For this reason, the processing of Steps S200 to S204B in a flowchart of FIG. 19 showing processing of Case 2 will be denoted by the same step numbers as those in FIG. 16, and the detailed description thereof will be omitted. Further, since Nos. 1 to 3 in FIG. 20 showing the state of a power source and the transition thereof are the same as those of FIG. 18, the detailed description thereof will be omitted.

In Case 2 of Example 2, the grip battery (the grip battery GB1 of the external grip 300; battery power source) is turned on (Step S206C) in a case where the shift of the camera system 10 to the electric power-saving state (the first processing of the switching preparation) ends by the processing performed until Step S204B. The camera system 10 is shifted to the switchable state (third switchable state) where electric power can be supplied from both the capacitor CP2 as the grip adapter and the grip battery as the battery power source by this processing (the second processing of the switching preparation), and the main power source is switched to the grip battery in this state (Step S208C of FIG. 19, No. 4 of FIG. 20; power source switching-control step).

In a case where the switching of the main power source ends, the camera system 10 returns to a normal state (Step S210C of FIG. 19; No. 5 of FIG. 20). Specifically, the electric power-saving state set at the time of the switching preparation (first processing) is released, the power source-switching software ends, and the capacitor CP2 as the grip adapter is turned off.

As described above, in Case 2 of Example 2, as in Case 1, the switching preparation (the first processing and the second processing) for shifting the camera system 10 to the electric power-saving state and the third switchable state is performed and the main power source is switched according to the order of priority in that state. Accordingly, it is possible to smoothly switch a power source while preventing instantaneous interruption.

<Switching of Main Power Source Between Power Sources of Camera Body>

The switching of the main power source between the power sources of the external grip 300 has been described in the above-mentioned example 2, but the method of switching a power source according to the embodiment of the invention can be applied to the switching of the camera body 100 between the power sources (to the adapter from the battery or to the battery from the adapter). In this case, the camera system 10 is shifted to a switchable state (second switchable state) where electric power can be supplied from both the adapter power source and the battery power source of the camera body 100 (the second processing of the switching preparation), and the main power source is switched in this state. The above-mentioned virtual mounting of a power source may be performed at the time of the shift of the camera system 10 to the switchable state. Further, the body battery BB1, the capacitor CP1, and the backup battery RB1 can be used as necessary in the power source switching preparation (the first processing and the second processing) and the power source switching control. It is possible to smoothly switch a power source while preventing instantaneous interruption as in Cases 1 and 2 by these kinds of control.

The respective aspects of the invention have been described above, but the invention is not limited to the above-mentioned aspects and may have various modifications without departing from the scope of the invention.

EXPLANATION OF REFERENCES

10: camera system
100: camera body
102: imaging element
104: AFE
106: A/D converter
108: DSP
110: image processing unit
112: memory
114: monitor
116: AE/AWB detection circuit
118: AF detection circuit
120: system LSI
122: power source monitoring unit
124: software storage unit
126: body-side power source circuit
128: operation unit
130: release button
132: dial
134: dial
136: dial
200: interchangeable lens
202: lens
202a: zoom lens
202b: focus lens
206: stop
208: lens drive unit
300: external grip
302: grip-side power source circuit
AD1: adapter
AD2: adapter
AF: phase difference
BB1: body battery
C1: cap
C2: cap
C3: cap
C4: lid member
C5: cover
C6: lid member
C7: cover
CP1: capacitor
CP2: capacitor
D1: dial
GB1: grip battery
L1: power source cable
L2: power source cable
OA: optical axis
R1: battery storage chamber
R2: battery storage chamber
RB1: backup battery
RB2: backup battery
S100 to S312: steps of power source switching control and power source switching preparation
SP1: cap storage portion
T1: connector
T2: connector
T3a: terminal
T3b: terminal
W1a: screw hole
W1b: screw

What is claimed is:

1. An electronic device comprising:
a device body on which a battery power source and an adapter power source are mountable; and
an external device which is to be attached to or detached from the device body and on which a battery power source and an adapter power source are mountable,
wherein electric power supply lines of the battery power source and the adapter power source of the device body and electric power supply lines of the battery power source and the adapter power source of the external device are shut off from each other,
wherein the device body includes:
an order-of-priority setting unit that sets an order of priority of supply of electric power to the electronic device between the battery power source and the adapter power source of the device body and the battery power source and the adapter power source of the external device;
a power source-switching preparation unit that performs switching preparation of a main power source which is a power source formed of either the battery power source and the adapter power source of the device body, or the battery power source and the adapter power source of the external device and supplys electric power to the electronic device, and
a power source-switching control unit that switches the main power source among the battery power source and the adapter power source of the device body and the battery power source and the adapter power source of the external device on the basis of the set order of priority according to a state of the main power source,
wherein the power source-switching preparation unit performs first processing for shifting the electronic device to an electric power-saving state and second processing for shifting the electronic device to a state where electric power is capable of being supplied from a plurality of power sources among the battery power source and the adapter power source of the device body and the battery power source and the adapter power source of the external device, as the switching preparation, and wherein the power source-switching control unit switches the main power source according to the set order of priority in a state where the switching preparation is performed.

2. The electronic device according to claim 1,
wherein the power source-switching preparation unit shifts the electronic device to a first switchable state where electric power is capable of being supplied from both the battery power source or the adapter power source of the device body, and the battery power source or the adapter power source of the external device, and
the power source-switching control unit switches the main power source in a state where the electronic device is shifted to the first switchable state.

3. The electronic device according to claim 2,
wherein the power source-switching preparation unit virtually shifts the electronic device to a state where electric power is also capable of being supplied from the adapter power source of any one of the device body or the external device as the first switchable state in a case where the power source-switching preparation unit detects that electric power is capable of being supplied from the adapter power source of any one of the device body or the external device, and
the power source-switching control unit switches the main power source in the first switchable state to which the electronic device is virtually shifted.

4. The electronic device according to claim 1,
wherein the power source-switching preparation unit shifts the electronic device to any one of a second switchable state where electric power is capable of being supplied from both the battery power source and the adapter power source of the device body or a third switchable state where electric power is capable of being supplied from both the battery power source and the adapter power source of the external device, and
the power source-switching control unit switches the main power source in a state where the electronic device is shifted to the second switchable state or the third switchable state.

5. The electronic device according to claim 1,
wherein the order-of-priority setting unit sets the order of priority of one of the device body and the external device, to which electric power is capable of being supplied from both the battery power source and the adapter power source, to an order of priority higher than the order of priority of one of the device body and the external device to which electric power is not capable of being supplied from both the battery power source and the adapter power source.

6. The electronic device according to claim 2,
wherein the order-of-priority setting unit sets the order of priority of one of the device body and the external device, to which electric power is capable of being supplied from both the battery power source and the adapter power source, to an order of priority higher than the order of priority of one of the device body and the external device to which electric power is not capable of being supplied from both the battery power source and the adapter power source.

7. The electronic device according to claim 3,
wherein the order-of-priority setting unit sets the order of priority of one of the device body and the external device, to which electric power is capable of being supplied from both the battery power source and the adapter power source, to an order of priority higher than the order of priority of one of the device body and the external device to which electric power is not capable of being supplied from both the battery power source and the adapter power source.

8. The electronic device according to claim 1,
wherein the order-of-priority setting unit sets the order of priority of the adapter power source of the device body to an order of priority higher than the order of priority of the battery power source of the device body, and sets the order of priority of the adapter power source of the external device to an order of priority higher than the order of priority of the battery power source of the external device.

9. The electronic device according to claim 1,
wherein the power source-switching preparation unit performs the switching preparation by using electric charges that are accumulated in a capacitor provided in the device body or a capacitor provided in the external device.

10. The electronic device according to claim 1,
wherein the power source-switching control unit switches the main power source by using a backup power source provided in the device body or a backup power source provided in the external device.

11. The electronic device according to claim 1,
wherein the power source-switching control unit switches the main power source by using electric charges that are accumulated in a capacitor provided in the device body or a capacitor provided in the external device.

12. The electronic device according to claim 1, further comprising:
a storage unit that stores software controlling the switching preparation and the switching,
wherein the power source-switching preparation unit performs the switching preparation by using the stored software, and
the power source-switching control unit performs the switching by using the stored software.

13. The electronic device according to claim 1,
wherein the device body comprises a power source detection unit detecting from which of the battery power source and the adapter power source of the device body and the battery power source and the adapter power source of the external device electric power is capable of being supplied, and
the order-of-priority setting unit sets the order of priority on the basis of a result of the detection.

14. The electronic device according to claim 1,
wherein the state of the main power source is a voltage level of the main power source.

15. An imaging apparatus comprising:
the electronic device according to claim 1;
an imaging optical system that is provided in the device body; and
an imaging element that is provided in the device body and outputs a signal representing an optical image of a subject formed by the imaging optical system.

16. The imaging apparatus according to claim 15,
wherein the power source-switching control unit does not perform the switching in a case where the imaging apparatus is not in a state where the main power source is switchable.

17. The imaging apparatus according to claim 16,
wherein the power source-switching preparation unit determines that the imaging apparatus is not in the state where the main power source is switchable, during a period until image data representing the subject is generated and recorded after the imaging element outputs the signal.

18. The imaging apparatus according to claim 15, wherein the power source-switching preparation unit shifts the imaging optical system and the imaging element to a sleep state as the electric power-saving state.

19. The imaging apparatus according to any one of claim 15, wherein the external device is an external grip for the device body.

20. A method of switching a power source of an electronic device including a device body on which a battery power source and an adapter power source are mountable, and an external device which is to be attached or detached to or from the device body and on which a battery power source and an adapter power source are mountable, wherein electric power supply lines of the battery power source and the adapter power source of the device body and electric power supply lines of the battery power source and the adapter power source of the external device being shut off from each other, the method comprising:

an order-of-priority setting step of setting an order of priority of supply of electric power to the electronic device between the battery power source and the adapter power source of the device body and the battery power source and the adapter power source of the external device;

a power source switching-preparation step of performing switching preparation of a main power source which is a power source formed of either the battery power source and the adapter power source of the device body, or the battery power source and the adapter power source of the external device and supplys electric power to the electronic device; and a power source switching-control step of switching the main power source among the battery power source and the adapter power source of the device body and the battery power source and the adapter power source of the external device on the basis of the set order of priority according to a state of the main power source, wherein the power source switching-preparation step performs first processing for shifting the electronic device to an electric power-saving state and second processing for shifting the electronic device to a state where electric power is capable of being supplied from a plurality of power sources among the battery power source and the adapter power source of the device body and the battery power source and the adapter power source of the external device as the switching preparation, and wherein the power source switching-control step switches the main power source according to the set order of priority in a state where the switching preparation is performed.

* * * * *